United States Patent
McFarland et al.

(10) Patent No.: US 11,471,780 B2
(45) Date of Patent: *Oct. 18, 2022

(54) SEQUENCED CHAMBER WAVE GENERATOR CONTROLLER AND METHOD

(71) Applicant: American Wave Machines, Inc., Solana Beach, CA (US)

(72) Inventors: Bruce McFarland, Solana Beach, CA (US); Clement Ginestet, Paris (FR)

(73) Assignee: AMERICAN WAVE MACHINES, INC., Solana Beach, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/592,337

(22) Filed: Feb. 3, 2022

(65) Prior Publication Data

US 2022/0203250 A1     Jun. 30, 2022

Related U.S. Application Data

(60) Continuation of application No. 17/467,042, filed on Sep. 3, 2021, which is a continuation of application
(Continued)

(51) Int. Cl.
*A63G 31/00* (2006.01)
*E04H 4/00* (2006.01)
(Continued)

(52) U.S. Cl.
CPC ......... *A63G 31/007* (2013.01); *E04H 4/0006* (2013.01); *G06F 3/0482* (2013.01); *G06F 3/0486* (2013.01); *G06F 3/04817* (2013.01); *G06F 3/04842* (2013.01); *G06F 3/04847* (2013.01); *A63B 69/0093* (2013.01); *B63B 34/70* (2020.02)

(58) Field of Classification Search
CPC . A63G 31/007; E04H 4/0006; G06F 3/04817; G06F 3/0482; G06F 3/04842; G06F 3/04847; G06F 3/0486
USPC .......................... 4/491; 405/79, 80; 472/128
See application file for complete search history.

(56) References Cited

U.S. PATENT DOCUMENTS

| | | |
|---|---|---|
| 2,406,413 A | 8/1946 | Test |
| 3,105,456 A | 10/1963 | Gongwer |

(Continued)

FOREIGN PATENT DOCUMENTS

JP     05-202626     8/1993

OTHER PUBLICATIONS

Untitled regarding "Ocean Dome".
Schematics for wave equipment—WaveTek.

*Primary Examiner* — Tuan N Nguyen
(74) *Attorney, Agent, or Firm* — Manuel de la Cerra

(57) ABSTRACT

A wave generating apparatus mobile application controller and method are provided in which a mobile controller actuates a plurality of wave generating chambers in sequence using a delay between the actuation of each chamber to produce a rideable wave in a pool. The mobile application controller allows the user to select the exact type of wave to be produced by the wave generator apparatus by selecting the size, shape, and pattern of the wave. The application also allows the user to use a camera to photograph or record herself or someone else, even while riding a wave.

20 Claims, 18 Drawing Sheets

Related U.S. Application Data

No. 16/795,492, filed on Feb. 19, 2020, now Pat. No. 11,131,107, which is a continuation of application No. 16/402,070, filed on May 2, 2019, now Pat. No. 10,612,256, which is a continuation of application No. 16/149,051, filed on Oct. 1, 2018, now Pat. No. 10,280,640, which is a continuation of application No. 14/808,076, filed on Jul. 24, 2015, now Pat. No. 10,145,135, which is a division of application No. 13/740,419, filed on Jan. 14, 2013, now Pat. No. 9,103,133, said application No. 17/592,337 is a continuation-in-part of application No. PCT/US2020/021576, filed on Mar. 2, 2020, which is a continuation of application No. 16/795,483, filed on Feb. 19, 2020, now Pat. No. 10,851,554.

(60) Provisional application No. 61/721,304, filed on Nov. 1, 2012, provisional application No. 62/885,768, filed on Aug. 12, 2019.

(51) Int. Cl.

| | | |
|---|---|---|
| *G06F 3/04817* | (2022.01) | |
| *G06F 3/0486* | (2013.01) | |
| *G06F 3/04847* | (2022.01) | |
| *G06F 3/04842* | (2022.01) | |
| *G06F 3/0482* | (2013.01) | |
| *A63B 69/00* | (2006.01) | |
| *B63B 34/70* | (2020.01) | |

(56) References Cited

U.S. PATENT DOCUMENTS

| | | | |
|---|---|---|---|
| 3,350,724 A | 11/1967 | Leigh | |
| 3,473,334 A | 10/1969 | Dexter | |
| 3,577,570 A | 5/1971 | Vincent | |
| 3,629,877 A | 12/1971 | Schuster | |
| 4,276,664 A | 7/1981 | Baker | |
| 4,467,483 A | 8/1984 | Bastenhof | |
| 4,515,500 A | 5/1985 | Bastenhof | |
| 4,522,535 A | 6/1985 | Bastenhof | |
| 4,558,474 A | 12/1985 | Bastenhof | |
| 4,692,949 A | 9/1987 | Dunn | |
| 4,730,355 A | 3/1988 | Kreinbihl et al. | |
| 4,730,807 A | 3/1988 | Miller | |
| 4,812,077 A | 3/1989 | Raike | |
| 4,979,244 A | 12/1990 | Bastenhof | |
| 4,999,860 A | 3/1991 | Chutter et al. | |
| 5,098,222 A | 3/1992 | Robinson | |
| 5,186,578 A | 2/1993 | Perslow | |
| RE34,407 E | 10/1993 | Frenzl | |
| 5,285,536 A * | 2/1994 | Long | E04H 4/0006 4/491 |
| 5,342,145 A | 8/1994 | Cohen | |
| 5,405,250 A | 4/1995 | Vowles | |
| 5,535,702 A | 7/1996 | Idbeis | |
| 6,256,625 B1 | 7/2001 | Bryer | |
| 6,475,095 B1 | 11/2002 | Henry | |
| 6,729,799 B1 | 5/2004 | Raike | |
| 6,738,992 B2 | 5/2004 | Lochtefeld | |
| 6,912,738 B2 | 7/2005 | Black | |
| 6,920,651 B2 | 7/2005 | Roberts | |
| 7,815,396 B2 | 10/2010 | McFarland | |
| 8,434,966 B1 * | 5/2013 | McFarland | A63G 31/007 4/491 |
| 10,612,256 B2 * | 4/2020 | McFarland | G06F 3/04842 |
| 11,131,107 B2 * | 9/2021 | McFarland | G06F 3/0482 |
| 2010/0201502 A1 | 8/2010 | Chang | |
| 2012/0096637 A1 | 4/2012 | LaFlamme | |

* cited by examiner

SEQUENCED CHAMBER WAVE GENERATOR CONTROLLER AND METHOD

1.0 TECHNICAL FIELD

The present application relates to wave generators, such as wave generators for making waves in pools for recreational purposes.

2.0 BACKGROUND

Wave generators are often used for recreational purposes. Wave generators create one or more waves in a pool or the like, and people typically either play in the waves or use the waves for aquatic sports such as board sports. Aquatic board sports, such as surfing and bodyboarding, require that the waves be rideable. Enthusiasts in these types of sports often use wave generators for competition, practice and entertainment.

Existing wave generators typically use wave generating chambers to produce a wave that travels in a direction where the peak of the wave is substantially parallel to the chambers and to the beach as it travels from the chambers towards the beach, and the wave is produced when the wave generating chambers (either one chamber or multiple chambers) are all activated simultaneously, resulting in the water being pushed away from the wave generating chambers. The wave then travels away from the chamber until it reaches the opposite end of the pool, breaking at some point between the wave generating chamber and the opposite end of the pool. The waves that are created from these chambers, however, always require single or multiple chambers to actuate simultaneously in unison. The waves can only be ridden for a short period of time and distance because after the wave is created, it begins to decrease in amplitude and quickly becomes not rideable. Japan App. No. 04-037314 (JPO Publication No. 05-202626) discloses a pool that produces waves that travel in a perpendicular direction from one side toward the other side of the pool. The side walls of the pool are in a fan shape to allow people to ride the wave longer and to avoid hitting the wall. This apparatus, however, only produces single waves that travel perpendicularly away from the generating apparatus until the wave reaches the opposite end of the pool, and does not teach sequencing. That apparatus attempts to provide a longer ride on the wave by simply angling the walls in a fan shape, but does not compensate for the wave losing amplitude and strength.

Other types of wave generating pools use a high velocity sheet of water shot over a bed form in the shape of a wave. These are not "true" waves, but rather water shaped into a wave. An example includes U.S. Pat. No. 5,236,280 which discloses a "Sheet Flow Water Ride." There are several shortcomings with this prior art. First, a conventional surf board with fins cannot be used because the fins would extend too deeply into the sheet flow of water and would touch the bed form underneath. Second, the bed form is static, such that only one type of "wave" can be produced.

What is needed is an apparatus that overcomes the shortcomings of the prior art, including providing an apparatus that can create a variety of rideable waves, and can further provide the rider with the ability to customize the wave characteristics, including the wave's size, shape, and pattern.

3.0 SUMMARY

What is provided herein is an aquatic sports amusement apparatus that includes a pool, a plurality of wave generating chambers that communicate with the pool so as to release water into the pool, and a mobile application controller that operates the chambers, such that each chamber in the plurality releases water to create waves. The controller can be connected to the plurality of chambers via a network connection; such a connection could include a local area network, a wireless network, the internet and/or a virtual private network. The controller could be located at a distant location from the pool and chamber complex, and the controller may be a smart phone, a personal computer, a personal digital assistant, a laptop and/or a tablet computer.

The controller also may have a graphical user interface (GUI) with a wave creation module, a wave ride module and a viewing module. Through these modules, users can create wave profiles and graphically model these wave profiles before actually creating the wave. The wave profiles can be shared with others. The GUI may also allow the user to video capture the wave, and then allow the user to view and share that video with others.

The system can also have a scheduling module to ensure that the controller's operation of the chambers is based on a single wave profile at a time. This further allows a user to create a wave profile, save that profile, and schedule a time to create and ride a wave based on that profile. This minimizes the user's dissatisfaction in waiting for the wave machine to be available, while maximizing the use of the wave machine, with fewer down periods.

Other aspects of the invention are disclosed herein, as discussed in the following Drawings and Detailed Description.

4.0 BRIEF DESCRIPTION OF THE DRAWINGS

The invention can be better understood with reference to the following figures. The components within the figures are not necessarily to scale, emphasis instead being placed on clearly illustrating example aspects of the invention. In the figures, like reference numerals designate corresponding parts throughout the different views. It may be understood that certain components and details may not appear in the figures to assist in more clearly describing the invention.

5.0 DETAILED DESCRIPTION

Following is a non-limiting written description of example embodiments illustrating various aspects of the invention. These examples are provided to enable a person of ordinary skill in the art to practice the full scope of the invention without having to engage in an undue amount of experimentation. As may be apparent to persons skilled in the art, further modifications and adaptations can be made without departing from the spirit and scope of the invention, which is limited only by the claims.

The apparatus disclosed herein in various example embodiments provides a sequenced-chamber wave-generating apparatus that may be adapted for use with aquatic board sports or any other suitable purpose, such as miniature modeling of wave formations. The apparatus overcomes the deficiencies in the prior art by creating a surging motion in the pool that changes the characteristics of the waves to create a considerably hollow barreling wave. The flow of water created by the presently-disclosed sequencing can resemble a diamond pattern and additional patterns, such as diamonds linked at the vertices. These patterns effectively reduce the depth of the water between successive waves, which causes the waves to pitch away from the chambers and to create a considerably hollow barrel. Additionally, the waves may travel in a direction that is not perpendicular to the wave generating apparatus, such that the wave strength continues to be replenished as the waves move across the pool. These are only two examples of waves that the wave generator apparatus can create.

Figure 1:
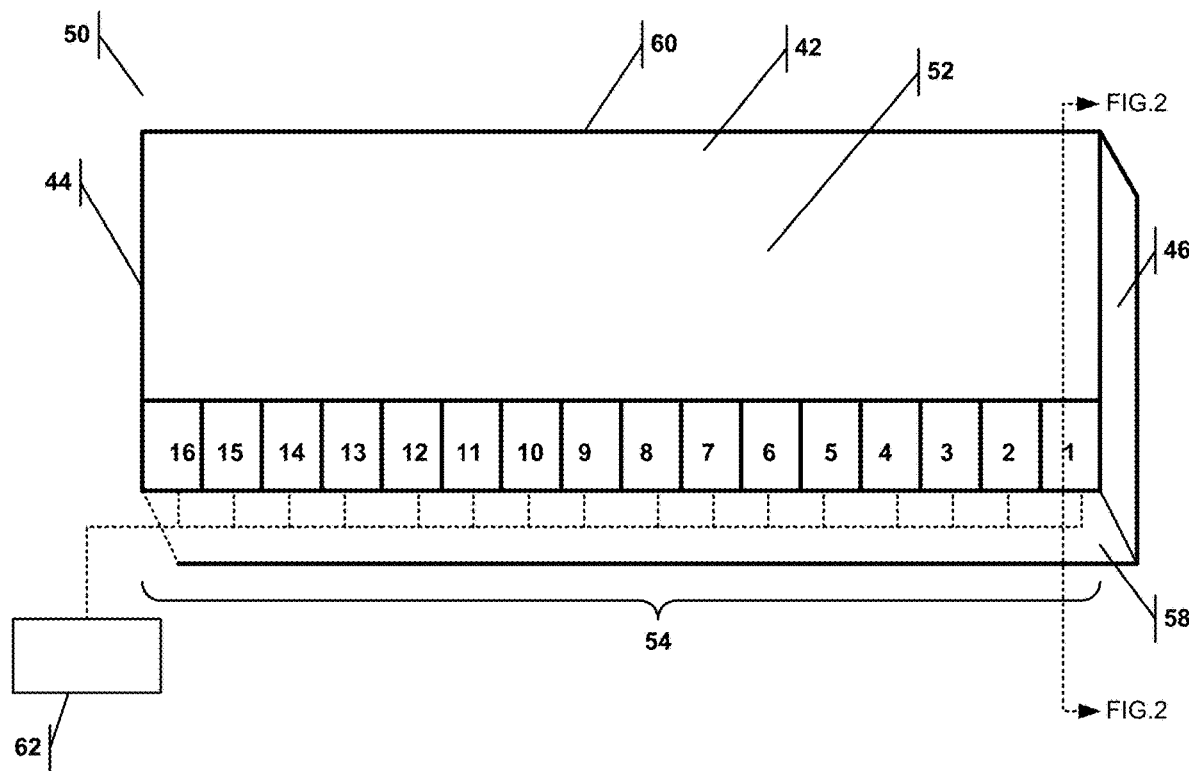
FIG. 1 is a top view of one example embodiment of a wave generator apparatus in a wave pool with sixteen chambers.

FIG. 1 illustrates an example embodiment of a wave generator apparatus, which comprises a pool or container 50, a body of water 52, a plurality of wave generating chambers 54 (each chamber is individually numbered 1-16), and a controller 62 to operate the chambers 54. In this example embodiment, there are sixteen wave generating chambers 54. Although there is no specifically required number of wave generating chambers 54 (other example embodiments include twenty-four and thirty-two chambers, for instance), too few chambers 54 in the apparatus may not be able to produce sufficient resolution to create a wave that can be ridden. In one example embodiment, each chamber is 10 feet by 5 feet by 3 feet, giving each chamber a capacity of 150 cubic feet. Other example embodiments may have wave generating chambers as big as 260 cubic feet or more. It would be apparent to those skilled in the art to modify the size and water displacement of the chambers as needed for specific applications.

The pool 50 may be rectangularly shaped and holds the body of water 52. The pool 50 has a first end 58, a second end 60, two sides 44, 46, and a floor 36. The first end 58 is comprised of a plurality of chambers 54 adjacent to one another, and the second end 60 is at the opposite end of the pool where the beach 42 is located. The two sides 44, 46 are at opposite ends of the pool 50. The first end 58, second end 60, and two sides 44, 46 act as walls for the pool 50 to contain the body of water 52, along with the floor 36 that is under the body of water 52. The body of water 52 rests in the pool 50 and may be in a still state until the chambers 54 begin to actuate in sequence and create a wave using the body of water 52 in the pool 50.

Figure 2:
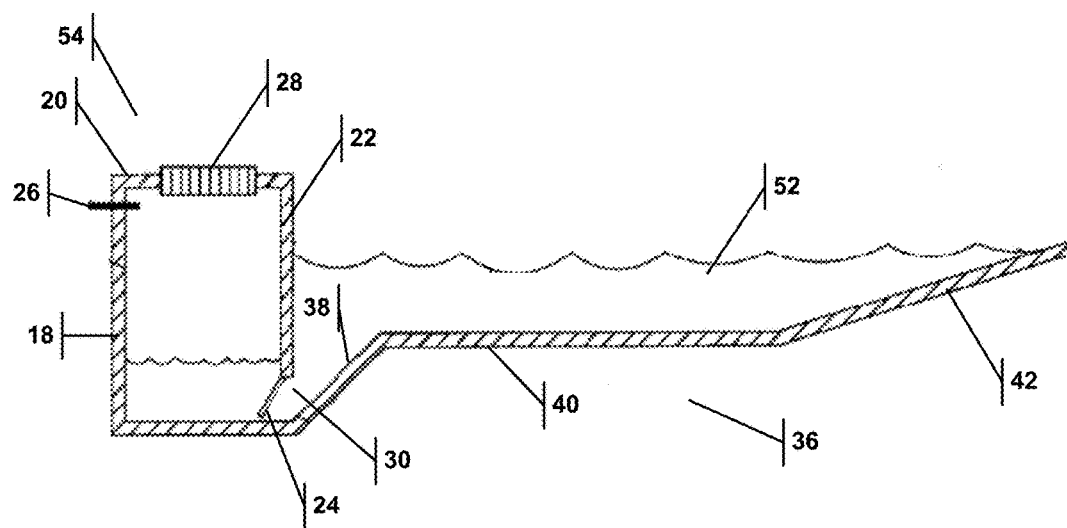
FIG. 2 is a cross-section of FIG. 1, illustrating one example embodiment of a wave generating chamber in a wave pool.

FIG. 2 illustrates an example embodiment of a single wave generating chamber 54, which can comprise a chamber space 56 having a back wall 18, an upper wall 20, and a reflecting wall 22 at the rear wall of the pool that faces the body of water 52 in the pool 50. An example may be that of U.S. Pat. No. 7,815,396 to McFarland, the same inventor of the present application, and the contents of that patent are incorporated herein by reference. A passageway 30 at the lower end of wall 22 allows for the communication of water between the chamber 54 and the body of water 52 in the pool. A mechanical two-way valve 24 may be located in passageway 30.

The chambers 54 may be connected to an air supply through an inlet valve 26 located close to the upper end of the chamber back wall 18 and may also be connected to a vent valve 28 in the upper wall 32, which may be connected to a vacuum pump. The floor 36 of the pool may have a first, upwardly inclined portion 38 extending from the passageway 30 away from the wave reflecting wall 22, a generally flat portion 40, and an upwardly inclined portion or beach 42 at the opposite, second end 60 of the pool 50.

In the operation of this example embodiment, the chamber 54 is first filled with air through the valve 26, thereby displacing water into the pool 50. The valve 26 is then closed, and the chamber air is vented suddenly through the vent valve 28, causing the water 52 to flow from the pool 50 through passageway 30 into the now empty space 56 in the chamber 54. The water level in the pool drops suddenly, creating a depression or trough in the water that reflects against the back or wave reflecting wall 22 of the pool 50. This creates a circulating motion of the water, which is enhanced by the design of the back wall 22. The vent valve 28 in the air chamber is shut at the proper time to prevent immediate water resurgence back into the pool 50, which enhances the second trough behind the peak. The mechanical two-way valve 24 can also be used to prevent immediate resurgence. The water valve 24 may be closed during the initial air fill phase to create a larger air volume in the chamber which, when released, creates a larger depression in the pool. Alternatively, the air valve 26 can rapidly supply pressurized air to the chamber after the chamber is filled with water, to push water out and amplify the wave peak. This process of pushing water out of the chamber and into the pool is known as releasing water. Alternatively, the vent valve 28 may be connected to a vacuum source such as a vacuum pump, or may be a vent outlet connected via suitable valving either to the atmosphere or to a vacuum source.

Figure 2A:
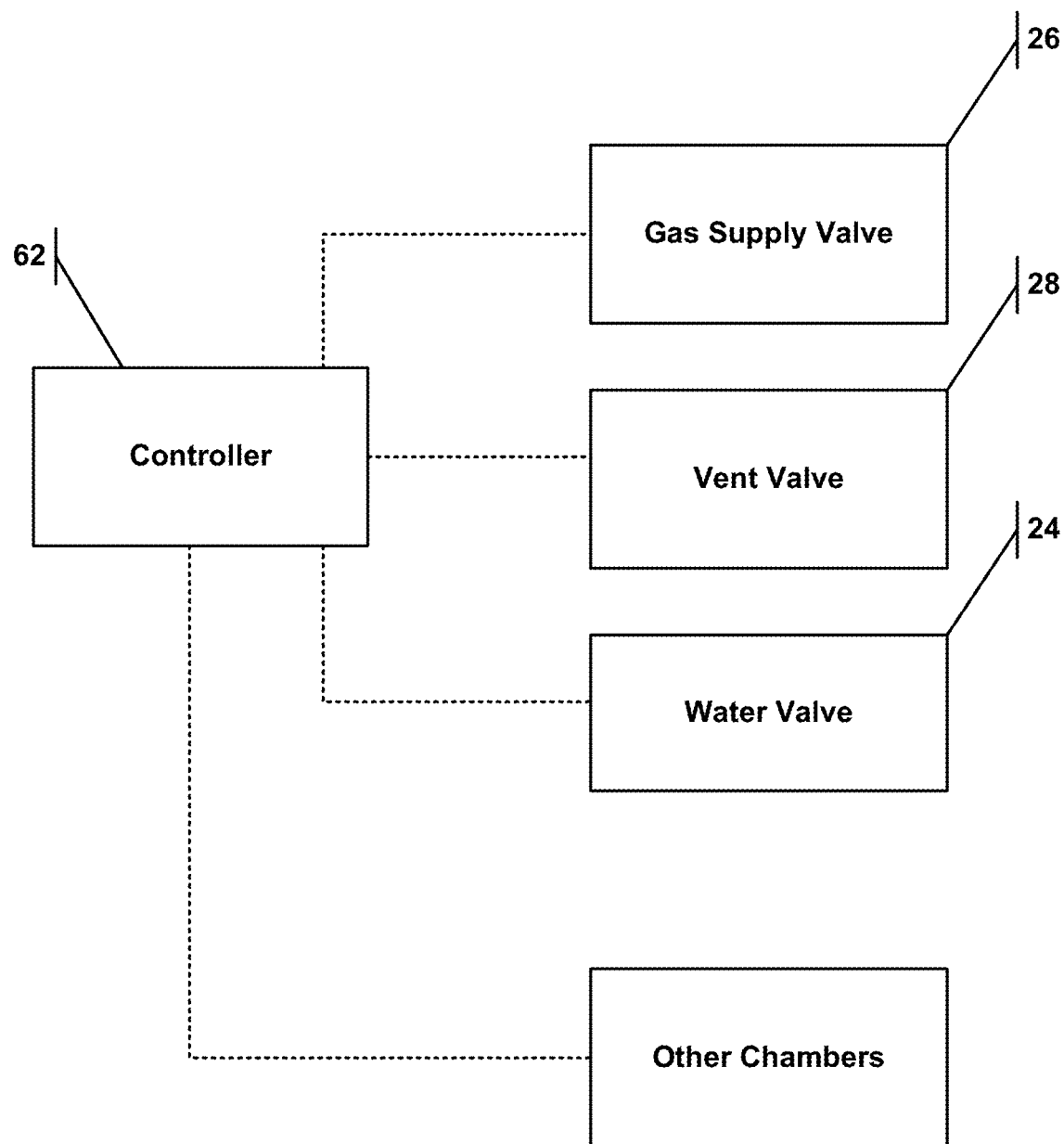
FIG. 2A is a schematic block diagram of a control system for controlling operation of the sequencing of the delay between actuating each chamber in the apparatus in FIGS. 1-2.
Figure 3:
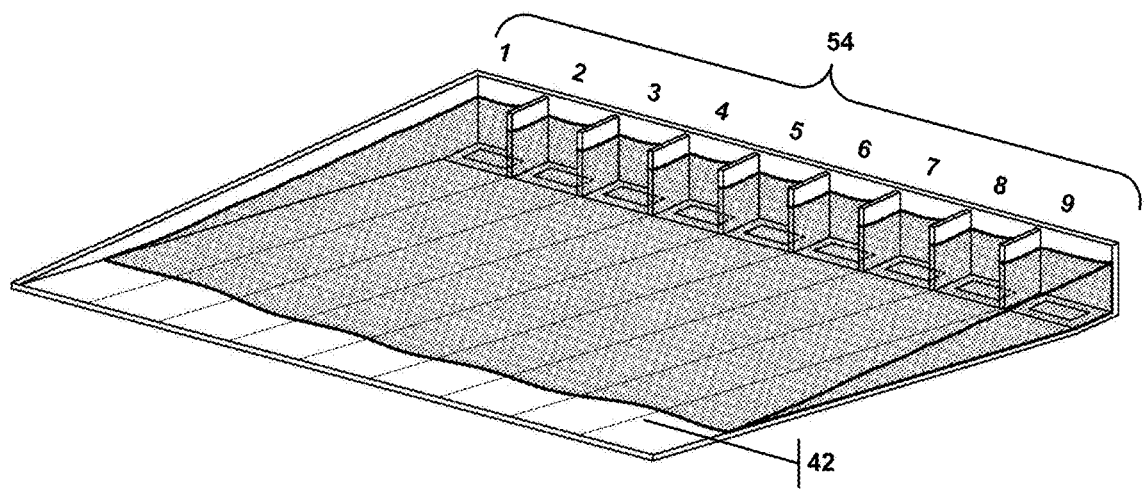
FIG. 3 is a top view of one example embodiment of a wave generator apparatus in a wave pool before any of the chambers has been actuated.

As illustrated schematically in FIG. 2A, the electronic controller 62 may be electrically connected with the valves 26, 28 and 24 in order to control the operation in the manner described above. The controller 62 may control this operation for each chamber, such that the controller 62 actuates each of the chambers in sequence. The controller 62 may begin by actuating the first chamber or the first set of chambers in the plurality. After a predetermined delay, the controller 62 actuates the second chamber or the second set of chambers in the plurality, and, after another predetermined delay, actuates the third chamber or the third set of chambers in the plurality. This may continue for a fourth chamber or the fourth set of chambers, or any number of additional chambers or additional set of chambers. The controller 62 continues actuating each chamber in the plurality after a delay. FIG. 2A illustrates that the controller 62 controls the valves in each chamber so that after actuating the first chamber or the first set of chambers, it can control the valves in that chamber or set of chambers and, after a delay, actuate the second chamber or the second set of chambers and control its valves. The controller 62 can actuate each chamber in sequence after a delay and can control the valves.

5.1 Diamond Pattern Waves

The wave generator apparatus has the ability to create waves where the peak of the wave travels in a direction that is substantially parallel to the chambers 54 and to the beach 42 as it travels from the chambers 54 towards the beach 42. The peak of the wave is defined as the highest water level in the pool. The direction that the peak travels is the path that the peak of the wave flows during the life of the wave.

To create the wave, the controller 62 may actuate the chambers 54 in a sequence with a delay between actuating each chamber or set of chambers 54, as described above. The delay is approximately a fraction of the chamber period. In the present example embodiment, as seen in FIGS. 3-6, nine chambers 1-9 are used to produce a wave that can be ridden where the peak of the wave is substantially parallel to the chambers 54 and to the beach 54 as it travels from the chambers 54 towards the beach 42.

Figure 7:
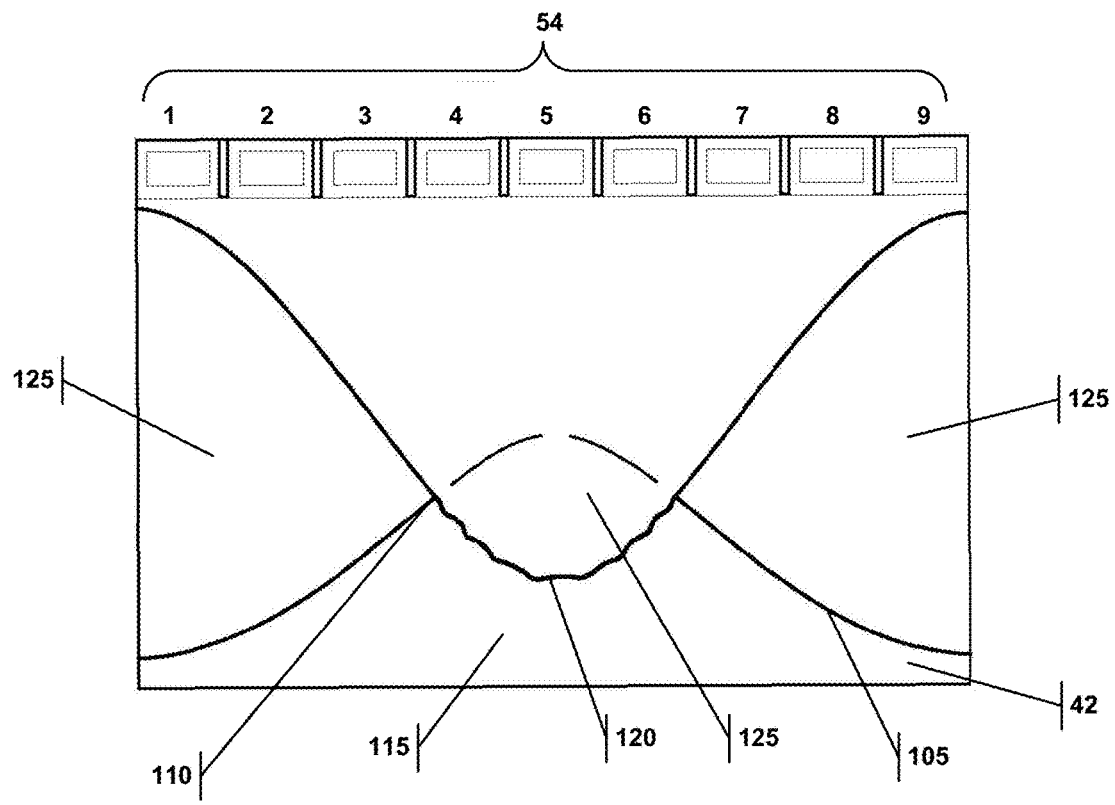
FIG. 7 is a top view of one example embodiment of a wave generator apparatus in a wave pool, showing diamond patterns created during the sequence, where the diamond patterns are linked at the vertices.

The wave is created by a surging motion in the pool 50 that changes the characteristics of the wave to create a considerably hollow barreling wave. As seen in FIG. 7, the flow of water created by the sequence resembles a diamond pattern, and additional patterns would resemble diamonds linked at the vertices. This pattern effectively reduces the depth of the water in the pool 50 between successive waves, which causes the waves to pitch away from the chambers and to create a considerably hollow barrel, as seen in FIG. 8.

Figure 4:
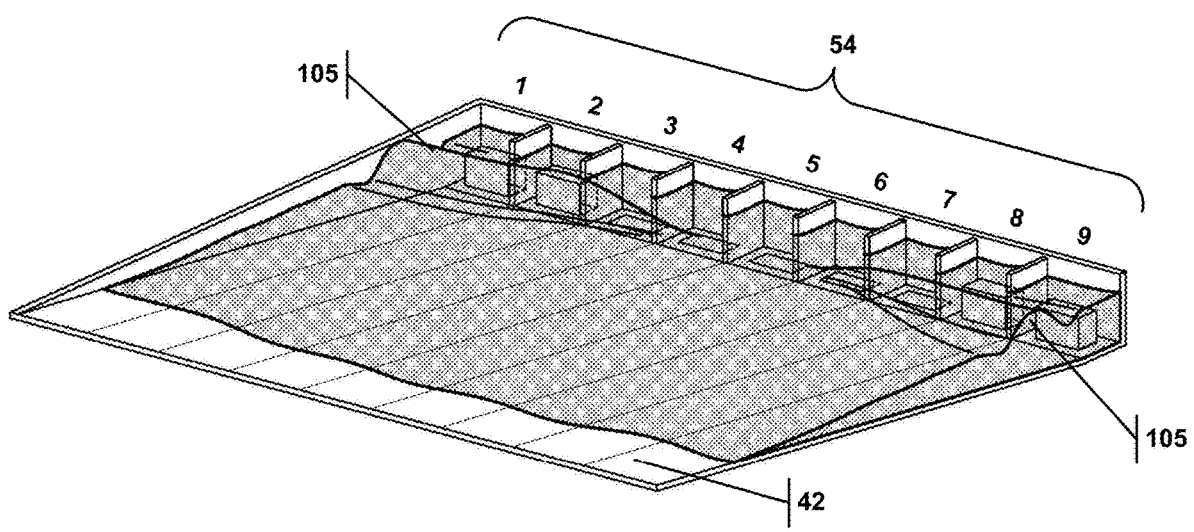
FIG. 4 is a top view of one example embodiment of a wave generator apparatus in a wave pool, showing the chambers being actuated in sequence to generate waves.
Figure 5:
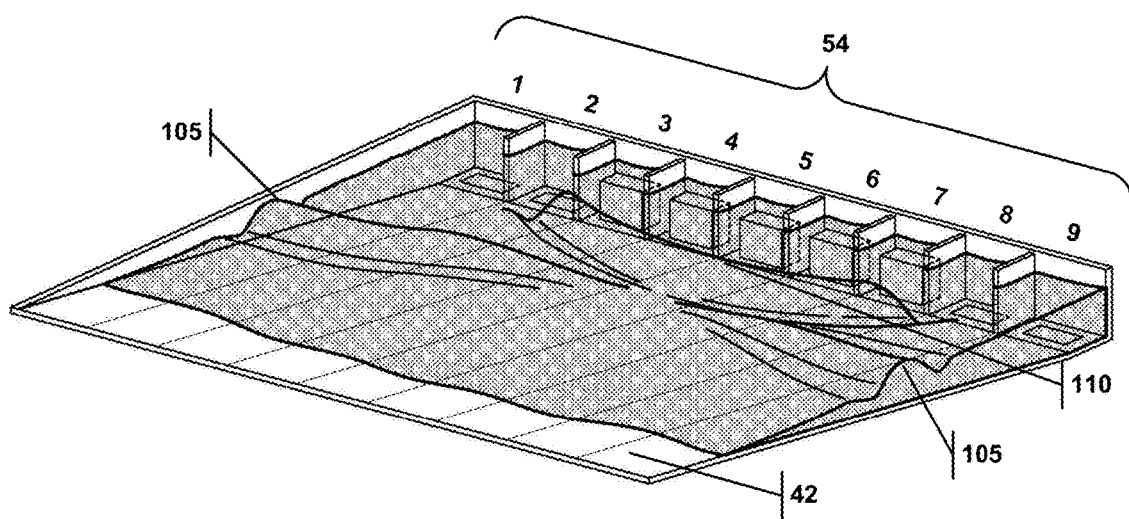
FIG. 5 is a top view of one example embodiment of a wave generator apparatus in a wave pool, showing the chambers being actuated in sequence to generate waves.
Figure 6:
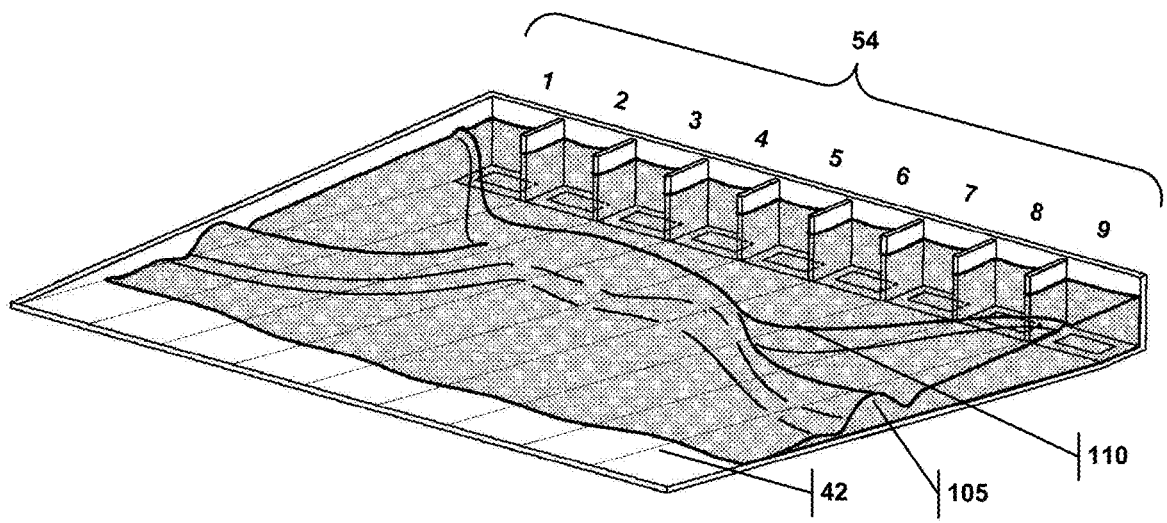
FIG. 6 is a top view of one example embodiment of a wave generator apparatus in a wave pool, showing the chambers being actuated in sequence to generate waves.

By way of example, the sequence may begin with the chambers 54 on the edges of the pool to initiate the first wave segment 105 shown in FIG. 4. Chambers 1-2 and 8-9 actuate to begin the sequence. After the delay, a second wave segment 110 shown in FIG. 5 is generated in the sequence from the center chambers between the edge segments (i.e., actuating chambers 3-7). The sequence continues to actuate the chambers to generate the first and second wave segment steps using the same delay. Therefore, the chambers operate in sequence, not all in unison.

Figure 8:
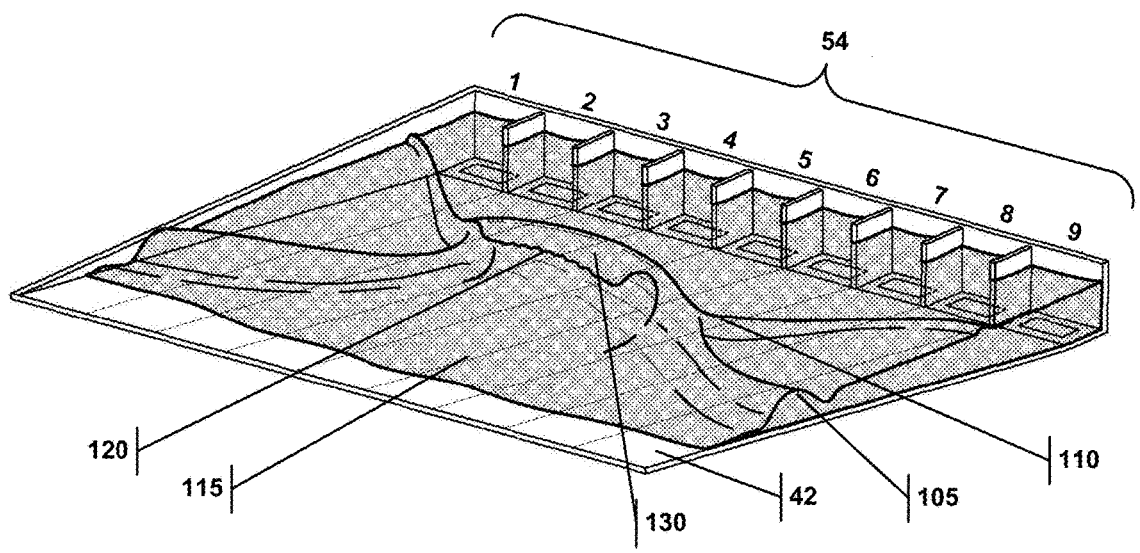
FIG. 8 is a perspective view of one example embodiment of a wave generator apparatus in a wave pool, showing a considerably hollow barrel wave that is created from the surge effect pitching away from the chambers.

This sequence creates the surging effect 115 in the pool 50 that creates barreling waves that are more hollow, i.e., the barrel-shaped wave 120 preferred by wave riding enthusiasts, as seen in FIG. 8. In other embodiments, the sequence can begin with the inner chambers and continue with the outer chambers. For example, the sequence may begin with chambers 54 in the center of the pool initiating a first wave segment. Chambers 3-7 could actuate to begin the sequence. After the delay, a second wave segment may be generated in the sequence from both sides of the first, center wave segment. This could be chambers 1-2 and 8-9. After a delay of the same or similar length, a third wave segment could be generated in the sequence from chambers 3-7, for instance. In either example embodiment, the sequence may continue to actuate the chambers to generate the second and third wave segment steps using the same or similar delay. Also, each segment can be produced by a single chamber or by two or more chambers, and the sequence can include more than two segments.

Moreover, when multiple adjacent chambers 54 actuate during each segment, there can be a secondary delay for each chamber. For instance, using the example sequence seen in FIGS. 4-5, during segment one, chambers 1-2 and 8-9 will all actuate using the primary delay, but with the secondary delay, they do not have to all actuate simultaneously. The secondary delay can actuate chambers 2 and 8 at a very slight delay after chambers 1 and 9 actuate. This secondary delay can be sequenced with any chambers within the primary delay sequence.

This type of sequencing can produce waves where the peak of the wave is substantially parallel to the chambers 54 and to the beach 42 as it travels from the chambers 54 towards the beach 42. As seen in FIG. 7, the pattern of the waves may resemble diamonds from a top view, and additional patterns may resemble diamonds linked at the vertices. The diamond effect is a result of the multiple wave segments generated in the sequence. This diamond pattern 125 creates a surging motion 115 in the entire pool 50 due to the sequence creating multiple waves 105, 110. The surging motion changes the breaking characteristics of the waves' natural flow. Indeed, the diamond pattern 125 reduces the depth of the water between successive waves because the previous wave will push the water away from the chambers 54 and towards the beach end 42. This causes waves to pitch away from the chambers 54 and to create a considerably hollow barrel 120. Additionally, the surge 115 interacts with the wave 110 near the end of its break, which increases the wave height or amplitude, just as backwash interacts with waves in the ocean.

The fractional delay between actuating each chamber 54 or set of chambers may be proportional to the chamber period. The chamber period is the time it takes a chamber to release the water and to refill to the predetermined level. To refill, the chamber 54 may permit a fixed amount of water, if any, to reenter the chamber 54. When a chamber completes its period, the chamber is prepared to actuate again. To produce waves where the peak of the wave is substantially parallel to the chambers 54 and to the beach 42 as it travels from the chambers 54 towards the beach 42, the controller operation may actuate each chamber 54 or set of chambers, using a delay in sequenced fashion. For example, just after the first segment (first chamber or first set of chambers) completes the wave production portion of its period, the controller 62 may actuate the second segment (second chamber or second set of chambers), and it begins its period. This sequence may be repeated with each segment (chamber or set of chambers) using the same or a similar delay, with the controller 62 operating the sequencing.

The controller 62 operates the sequenced fashion or sequencing, which comprises each chamber in the plurality actuating after a delay and completing a chamber period. The chamber period that is used as the delay by the controller 62 may be approximately one chamber period. The amount of delay in the sequence can be adjusted to as low as 0.10 of a chamber period to adjust the amplitude of the wave and the direction that the wave peak may travel. The delay may be more than one chamber period. Also, the delay may vary between adjacent chambers.

When a chamber 54 or set of chambers has completed the process of pushing out the water or air needed to create a wave (for example, after half of the entire chamber period), the subsequent chamber or set of chambers can activate in the sequence. This allows the waves to continue to flow and to create a surging effect. For example, in the example embodiment shown in FIGS. 4-5, each chamber period may be completed in two seconds. Therefore, the delay in the sequence would be set at one second, which is half of the chamber period. When each segment is completed, a new wave segment is then produced in sequence. While this example uses half of the chamber period as the delay in the sequence, similar sequences may be created with timing delays that are sequenced to actuate a chamber 54 or set of chambers during or soon after the previous chamber's or set of chambers' period.

The amplitude or height of the peak 130 of the wave 110 created generally depends on the size of the wave generating apparatus. However, the surge that is created using the present system increases the height of the wave over those resulting from other wave-generating apparatus designs because the surge 115 interacts with the wave 110 near the end of its break, as shown in FIG. 8, e.g. barreling perspective view following the sequence in FIG. 6. This interaction pushes the wave up to create a higher, bigger wave that tends to have desirable barreling characteristics.

Figure 9:
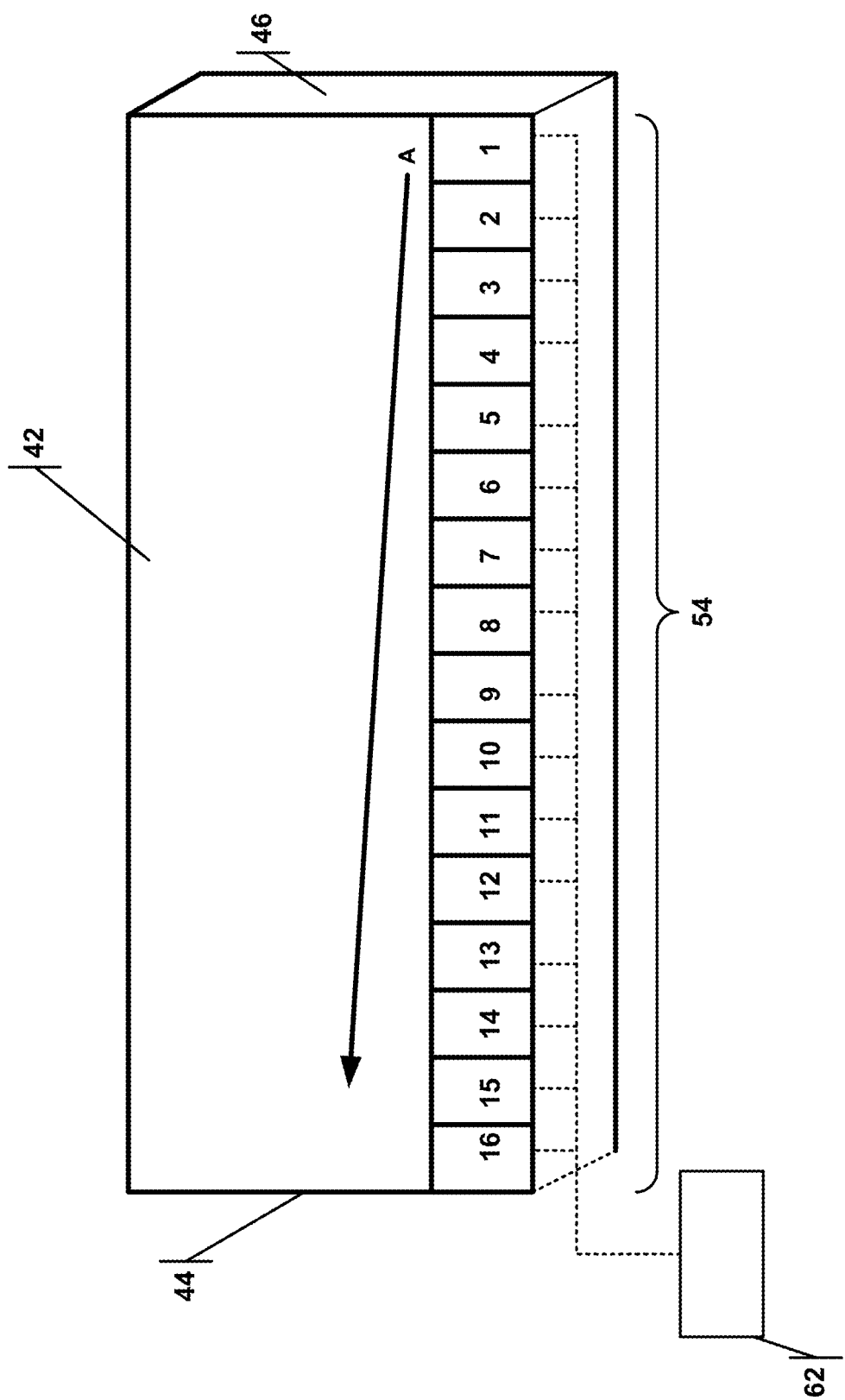
FIG. 9 is a top view of one example embodiment of a wave generator apparatus in a wave pool, showing the direction that the wave may travel.

5.2 Wave Peak that Travels in a Direction not Perpendicular to the Wave Generating Apparatus The wave generator apparatus has the ability to create waves where the peak of the wave travels in a direction that is not substantially perpendicular to the ends of the pool and the one or more chambers 54, as illustrated in FIG. 9. The peak of the wave is defined as the highest water level in the pool. The direction the peak travels is the path that the peak of the wave travels during the life of the wave. Although the wave may reach the beach end 42 of the pool opposite the chambers, the wave peak may continue to travel in a direction that is not perpendicular to the chambers 54.

To create a wave where the peak travels in a direction that is not substantially perpendicular to the chambers 54, the controller 62 may actuate the chambers 54 in a sequence with a delay between actuating each chamber, as described above. The delay is approximately a fraction of the chamber period. In the present example embodiment, sixteen chambers 1-16 are used to produce a wave that can be ridden, and the peak travels in a direction that is not substantially perpendicular to the chambers 54 in direction A.

The sequence starts with chamber 1 and continues sequentially (in lowest to highest numerical order of the chambers) down the plurality of chambers, which determines the direction of the wave. The wave breaks nearly right out of the chamber, and the break of the wave allows the peak to travel in a direction not substantially perpendicular to the chambers. Thus, a rider is able to ride the wave over much of the pool's water surface area. The peak continues until it reaches the side 44 of the pool 50. Although the path that the peak of the wave travels is not exactly parallel to the chambers 54, the pool may be constructed such that the peak may reach the side wall 44 before the peak could reach the opposite, beach end 42 of the pool. As each chamber actuates, the apparatus replenishes the wave to continue its momentum such that the wave can continue to be ridden.

Immediately after a chamber 54 is activated, it creates a trough in the body of water 52 by allowing the water to enter the chamber space 56. The trough is created outside of the chamber 54 where the water entered the chamber 54. When the chamber 54 pushes or releases the water out to create a wave, the water flows into the area previously vacated and is now a trough. The sequencing allows the wave to travel in a direction not substantially perpendicular to the chamber 54 and to break to create a wave.

The fractional delay between actuating each chamber may be proportional to the chamber period. The chamber period is the time it takes a chamber to release the water and to refill to the predetermined level. To refill, the chamber 54 may permit a fixed amount of water, if any, to reenter the chamber 54. When a chamber completes its period, the chamber is prepared to actuate again. To create a peak that travels in a direction not substantially perpendicular to the chambers 54, in direction A, the controller operation may actuate each chamber, using a delay, in a sequenced fashion. For example, while chamber 1 is in the wave production portion of its period, the controller 62 actuates chamber 2, and it begins its period. This sequence is repeated with each chamber using the same delay, and with the controller 62 operating the sequencing.

The controller operates the sequenced fashion or sequencing, which comprises each chamber in the plurality actuating after a delay and completing a chamber period. The fraction of the chamber period that is used as the delay by the controller 62 is approximately between 0.75 and 0.10. The amount of delay in the sequence can be adjusted within this range to adjust the amplitude of the wave and the direction that the wave peak may travel. Also, the delay may vary between adjacent chambers.

By way of example only, a delay of 0.25 can create a wave traveling in direction A, as illustrated in FIG. 9. The 0.25 delay means that the controller 62 may actuate chamber 2 when chamber 1 has completed 0.25 of its chamber period. Likewise, the controller 62 may actuate chamber 3 when chamber 2 has completed 0.25 of its chamber period. This delay may continue in the entire sequence.

When a chamber 54 is half of the way complete with the process of pushing out the water or air needed to create a wave (i.e., 0.25 of the entire chamber period), the subsequent chamber can activate in the sequence. This allows the wave to continue in the desired direction A. For example, in the example embodiment in FIG. 9, each chamber period is completed in four seconds. Therefore, the delay in the sequence would be set at one second, which is 0.25 of the chamber period. When the entire sequence is completed, a new wave can then be produced using the same sequence. While this example uses 0.25 of the chamber period as the delay in the sequence, similar waves can be created with timing delays that are sequenced to actuate a chamber 54 when the previous chamber 54 is in the process of the wave generating phase of the chamber period.

The amplitude or height of the peak of the wave created generally depends on the size of the wave generating apparatus. However, using this sequencing method, the peak traveling in direction A has an amplitude of nearly twice that of the peak traveling perpendicular to the chambers 54 in direction C. The peak of the wave may increase as it builds through the first few chambers in the sequence, until it reaches its maximum height. For example, using chambers 54 that are 150 cubic feet, the wave reaches about six feet in height. Conversely, a wave generated without sequencing that travels in a direction perpendicular to the wave generating chambers 54, in direction C, may reach a height of about three feet.

Figure 14:
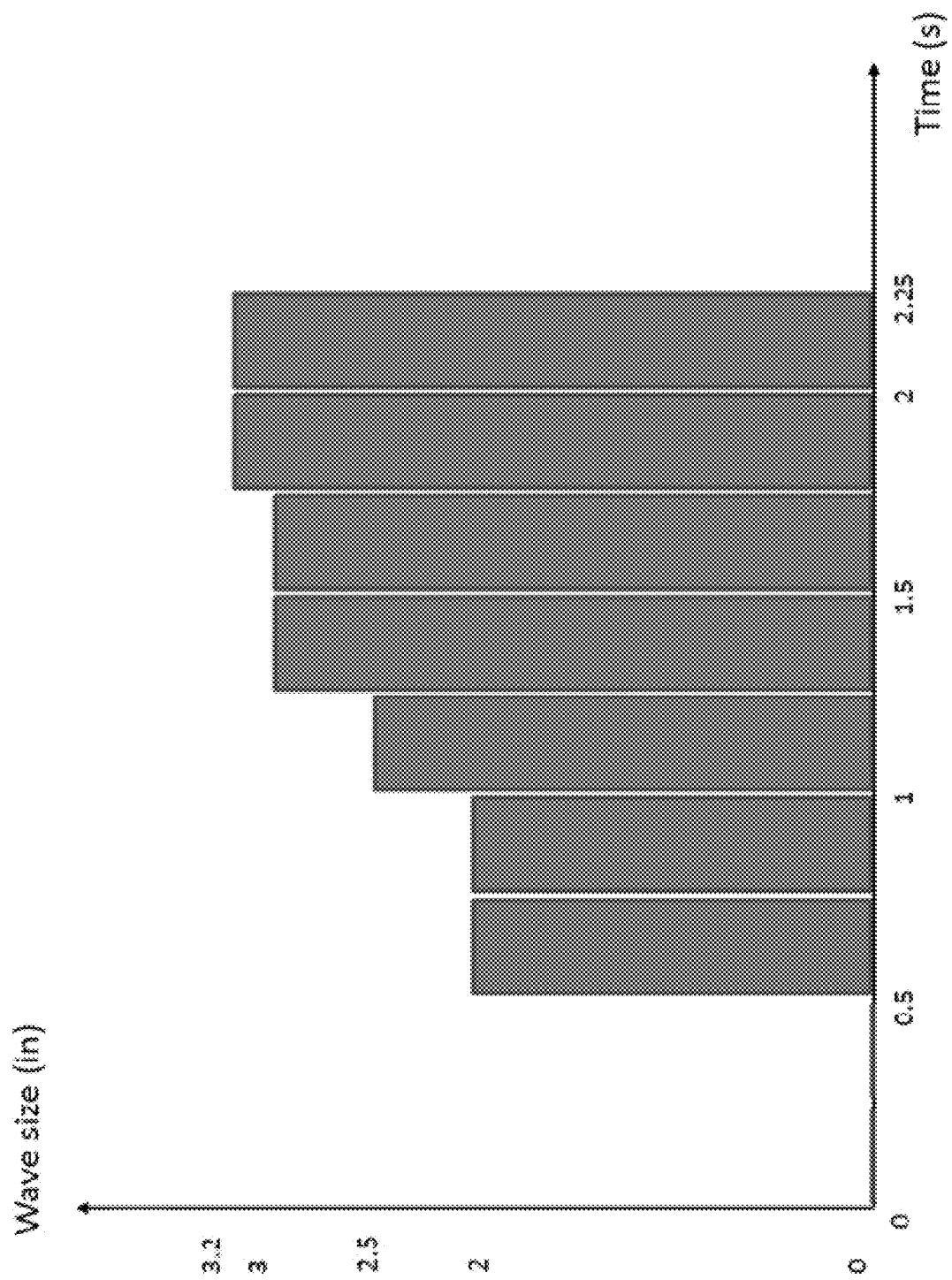
FIG. 14 is a graph showing the size of the wave and the amount of time it takes the wave to reach that size for a small-scale version of the apparatus with nine chambers.

For example, using a small version of the wave generating apparatus with only nine chambers yielded the results presented in FIG. 14. When a sequence with 0.25 delay is performed, a trough is created at 0.5 seconds, and the wave dramatically starts to build at 0.75 seconds, which is roughly when the third chamber is actuated. The wave has a peak of 2 inches at this point, which is a dramatic increase from 0.5 seconds, when the wave height was 0 inches. At about 1.25 seconds, the wave starts to crest just past the third chamber, when the peak reaches 2.5 inches. The wave's peak heightens to 3 inches when it reaches the fourth chamber. This occurs at 1.5 seconds, which coincides with when the sixth chamber is actuated by the controller 62. At 2 seconds, the peak reaches its maximum height of 3.2 inches. Conversely, a wave traveling in a direction perpendicular to the chambers 54 has a maximum peak height of only 2 inches.

Figure 12:
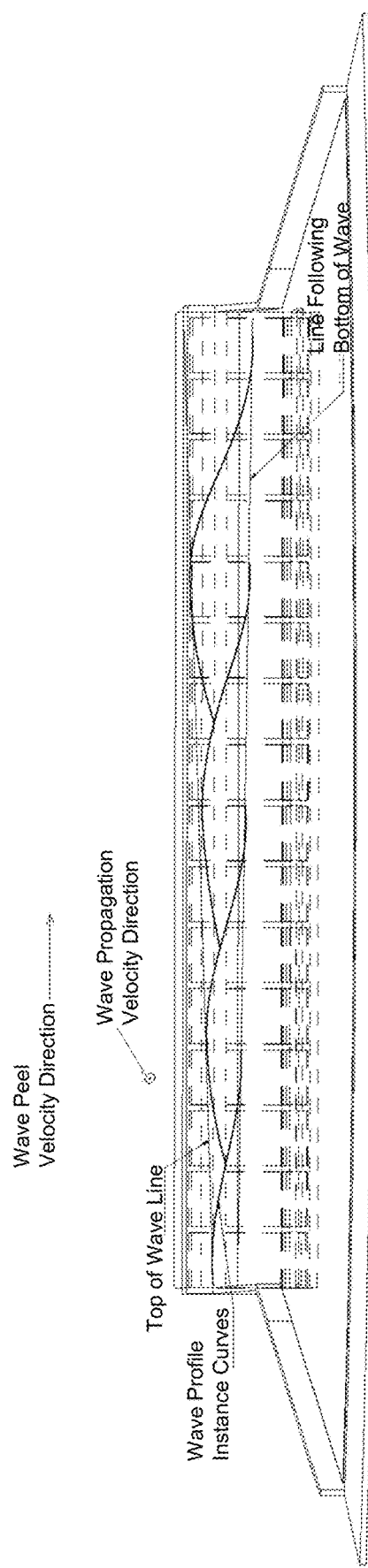
FIG. 12 is a view from the beach side or the side opposite the wave generating chambers of the pool. It shows the progression of the wave as it flows and how the height increases at various instances.

As illustrated in FIG. 12, the wave increases in height as it continues to travel, and the chambers 54 continue to push the wave. The wave size or height increases as a result of each chamber 54 releasing water into the pool, which pushes into the same piece of wave, causing it to amplify. The same piece of wave is pushed when each chamber actuates. This process continues through the beginning portion of the sequence or first few chambers until the wave reaches its maximum height. If there are too few chambers 54, the wave may not be smooth enough to ride. Likewise, if the chambers 54 produce a wave too big, it may be too choppy and not smooth enough to ride.

Figure 10:
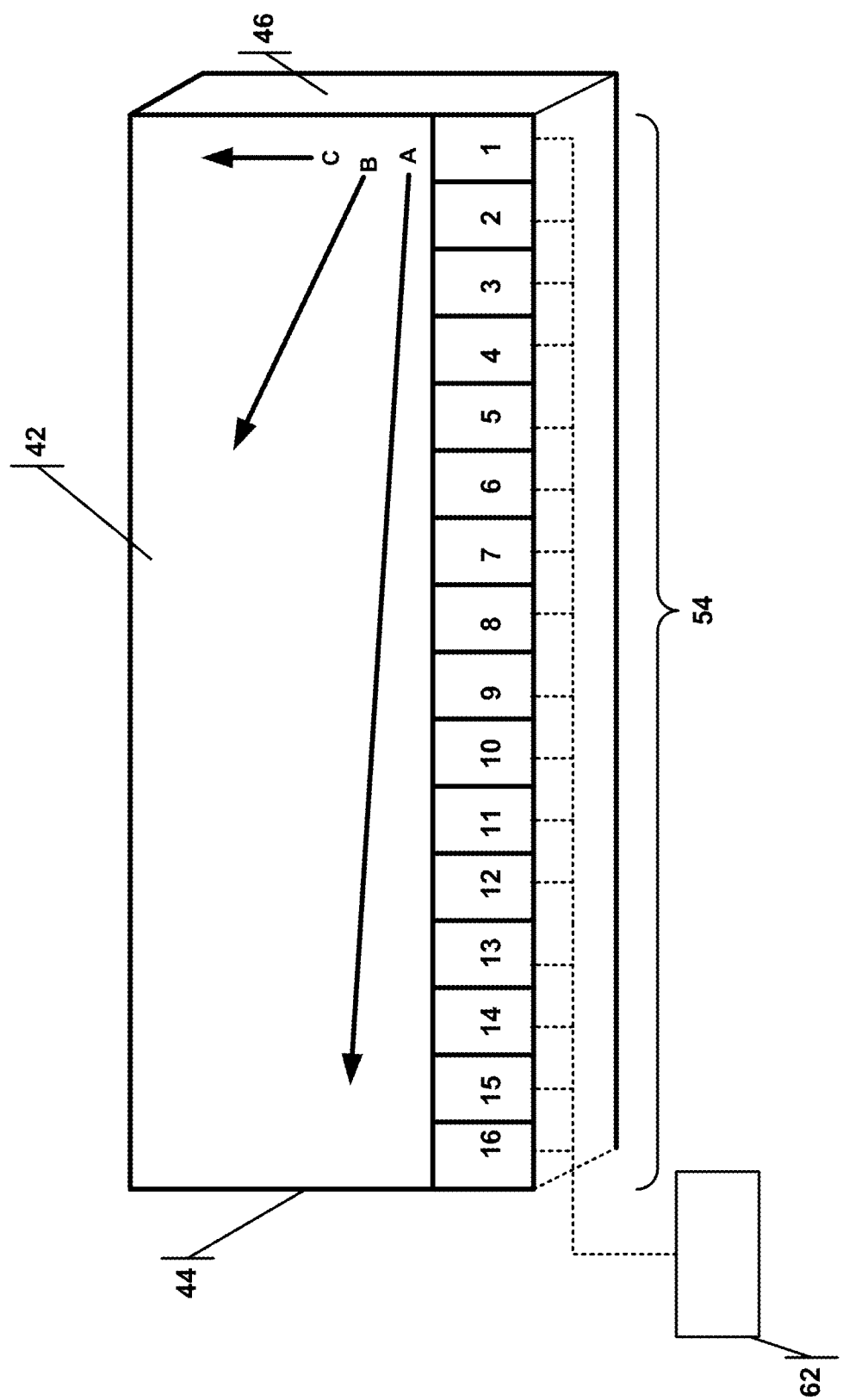
FIG. 10 is a top view of one example embodiment of a wave generator apparatus in a wave pool, showing multiple directions that the wave can flow, depending on the amount of delay in the sequence.

The direction of the peak is determined by the delay in the sequencing of the chambers. FIG. 10 illustrates the different directions the peak can travel depending on the delay between the chambers. For example, if there is no delay, and each chamber 54 actuates at the same time, the peak may travel perpendicular to the chambers 54 in the direction C towards the beach 42. When the controller 62 uses sequencing for a delay between each chamber 54, the peak may travel in more of an angled direction, in accordance with the order of the sequence. Here, in FIG. 10, the sequence starts with chamber 1 actuating, then chamber 2, then chamber 3, and continues down the plurality of chambers 54 until chamber 16 actuates. The peak may flow towards the side 44 when this sequence continues.

An increase in the delay sequence may cause the peak to travel in a direction that is more angled towards the side 44. For example, a shortened delay in the sequence would result in the peak traveling in the direction B, which flows more obliquely towards the side 44. When increasing the delay even more, the peak can travel in a direction not substantially perpendicular to the chambers 54 towards the side 44 in the direction A.

Figure 11:
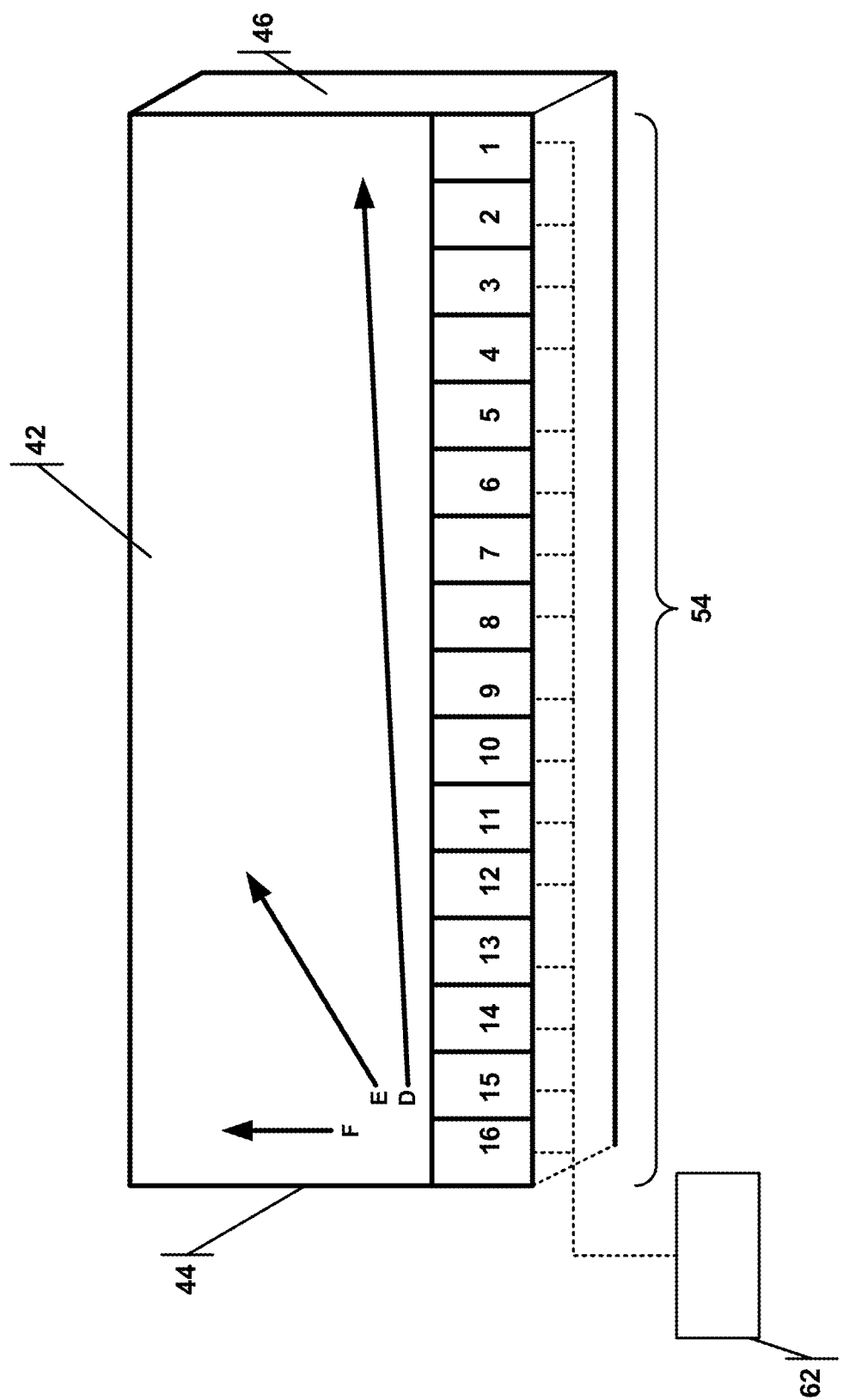
FIG. 11 is a top view of one example embodiment of a wave generator apparatus in a wave pool, showing multiple directions that the wave can flow, depending on the amount of delay in the sequence.

As illustrated in FIG. 11, the peak can also travel in the other direction towards the side 46. To do so, the sequence would have to start at chamber 16 and end at chamber 1. A shortened delay between the controller 62 actuating the chambers may result in the peak traveling in somewhat of an angle towards the side 46, in the direction E. A longer delay between the controller 62 actuating the chambers can result in the peak traveling in a direction not substantially perpendicular to the chambers in the direction D, towards the side 46. Also, chambers 16 and 1 could be actuated at the same time, then the adjacent chamber actuated after a delay, and so on, such that two wave peaks are created, one moving in the direction D (FIG. 11) and one moving in the direction A (FIG. 10).

Figure 13:
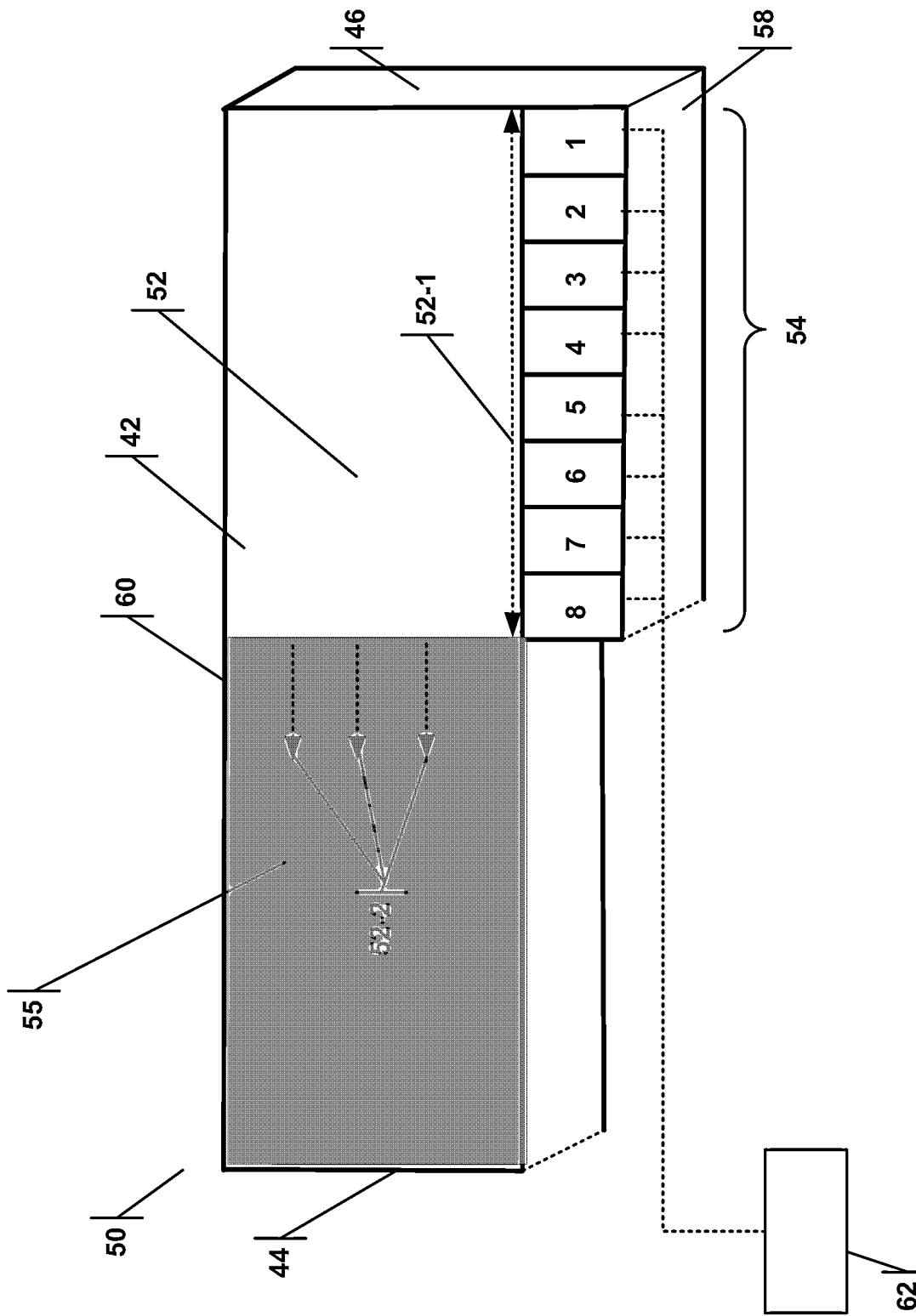
FIG. 13 is a top view of one example embodiment of a wave generator apparatus in a wave pool with the side wall extending beyond the wave generating chambers.
Figure 13A:
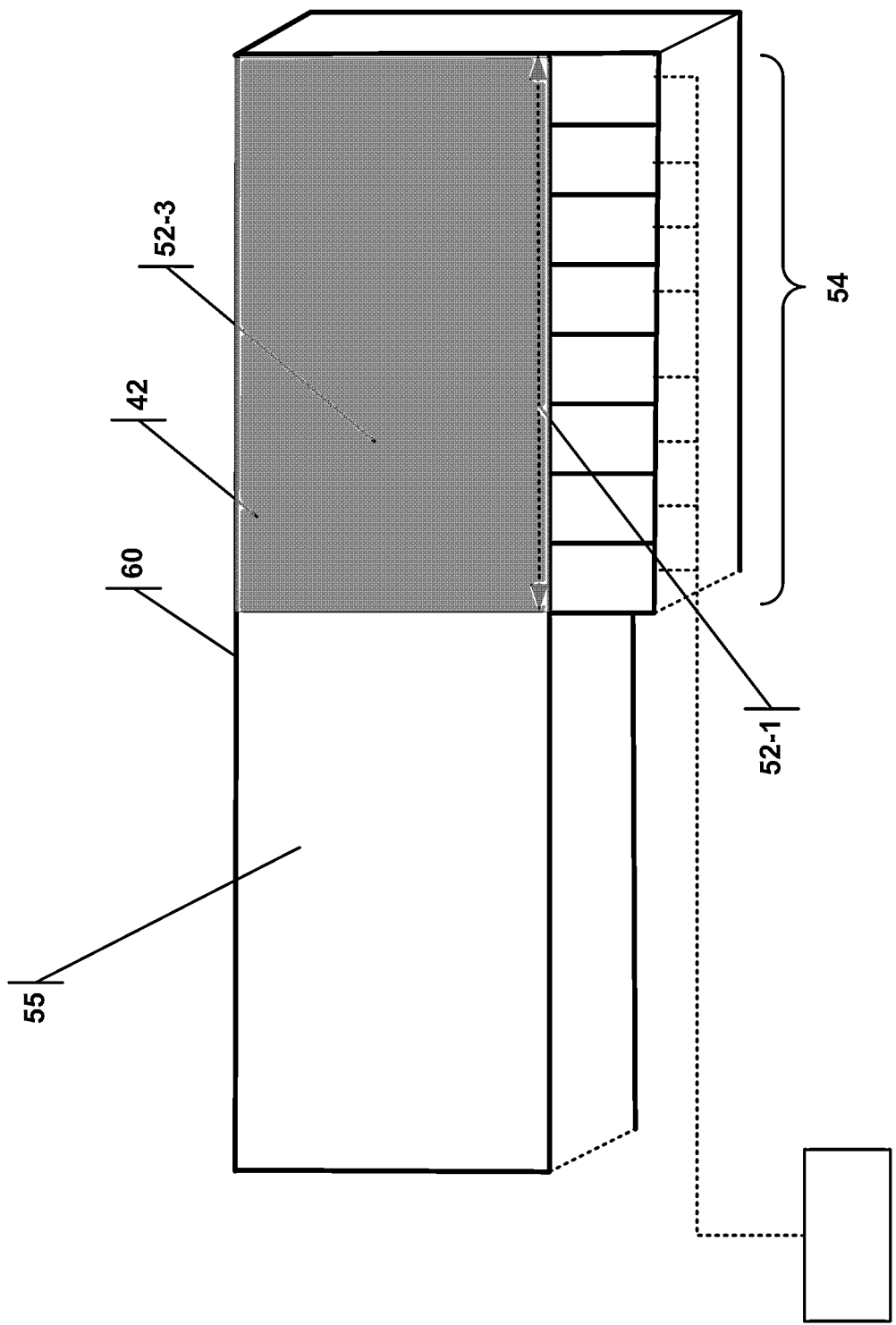
FIG. 13A illustrates the region that is adjacent to the projection of the chamber face, allowing the wave to continue to travel into the region.
Figure 13B:
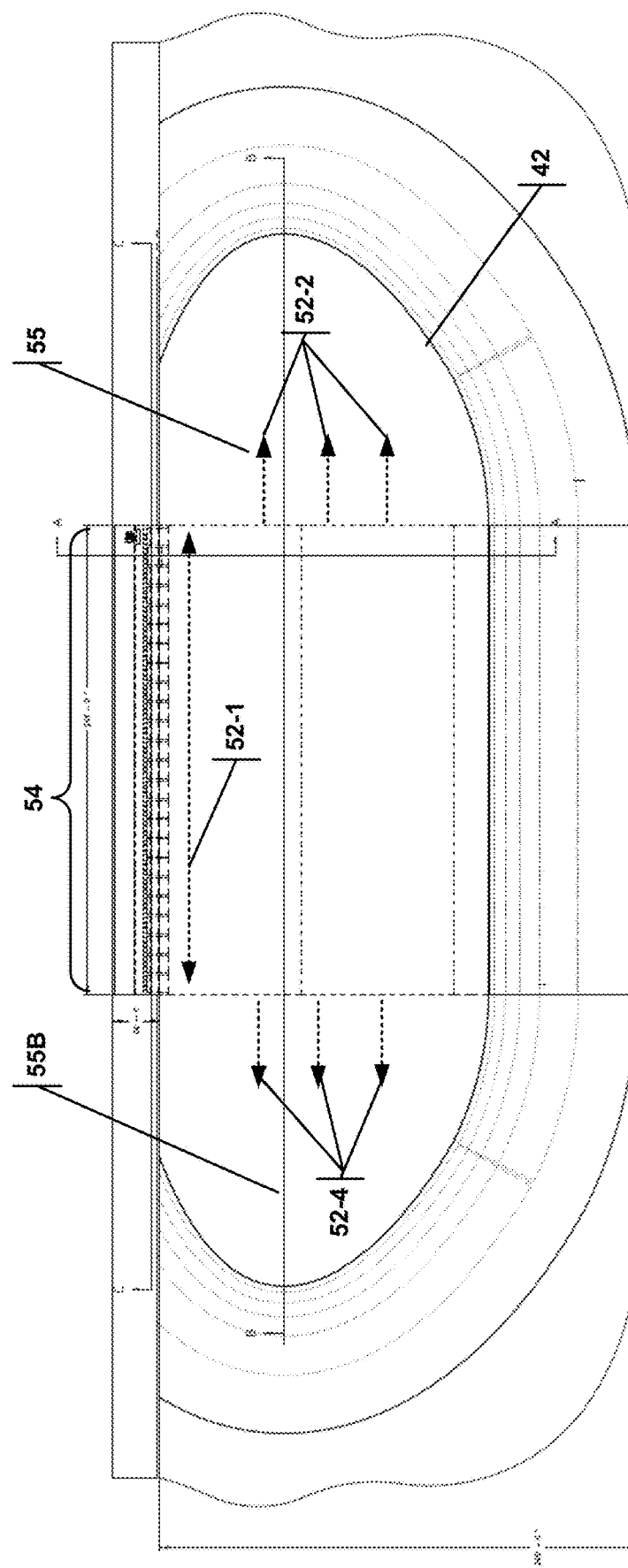
FIG. 13B is a top view of a wave generating apparatus with a first and a second regions extending away from the chambers in a direction that is parallel to the chamber face. Again, these regions extend the ride time on the waves.

FIG. 13 illustrates an example embodiment where the pool 52 extends beyond the chambers 54 to form a region 55 (shaded). The chambers form and edge of the pool 52, and define a chamber face 52-1. The region 55 extends away from the chambers 54 in a direction that is parallel to the chamber face (see arrow 52-2). As shown, the region 55 may extend laterally away from the chambers 54 by a length that is greater than the width of a single chamber (FIG. 13 shows a region 55 extending approximately eight chamber widths). Stated another way, and as shown in FIG. 13A, the region 55 is adjacent to the projection of the chamber face 52-1 across the pool (shown as shaded area 52-3) to the beach 42. This allows the wave to continue to travel into the region 55 after the sequence is complete, thus allowing a rider more time to ride the created wave. Shown in FIG. 13B is a top view of a wave generating apparatus with a first region 55 extending away from the chambers 54 in a direction that is parallel to the chamber face (see arrow 52-2). On the opposite side of the chambers 54 is a second region 55B extending away from the chambers 54 in a direction that is parallel to the chamber face (see arrow 52-4). The pool 52 has a curved beach 42 along part of the first region 55. Again, these regions extend the ride time on the waves.

5.3 System for Controlling the Wave Generator Apparatus

Figure 15:
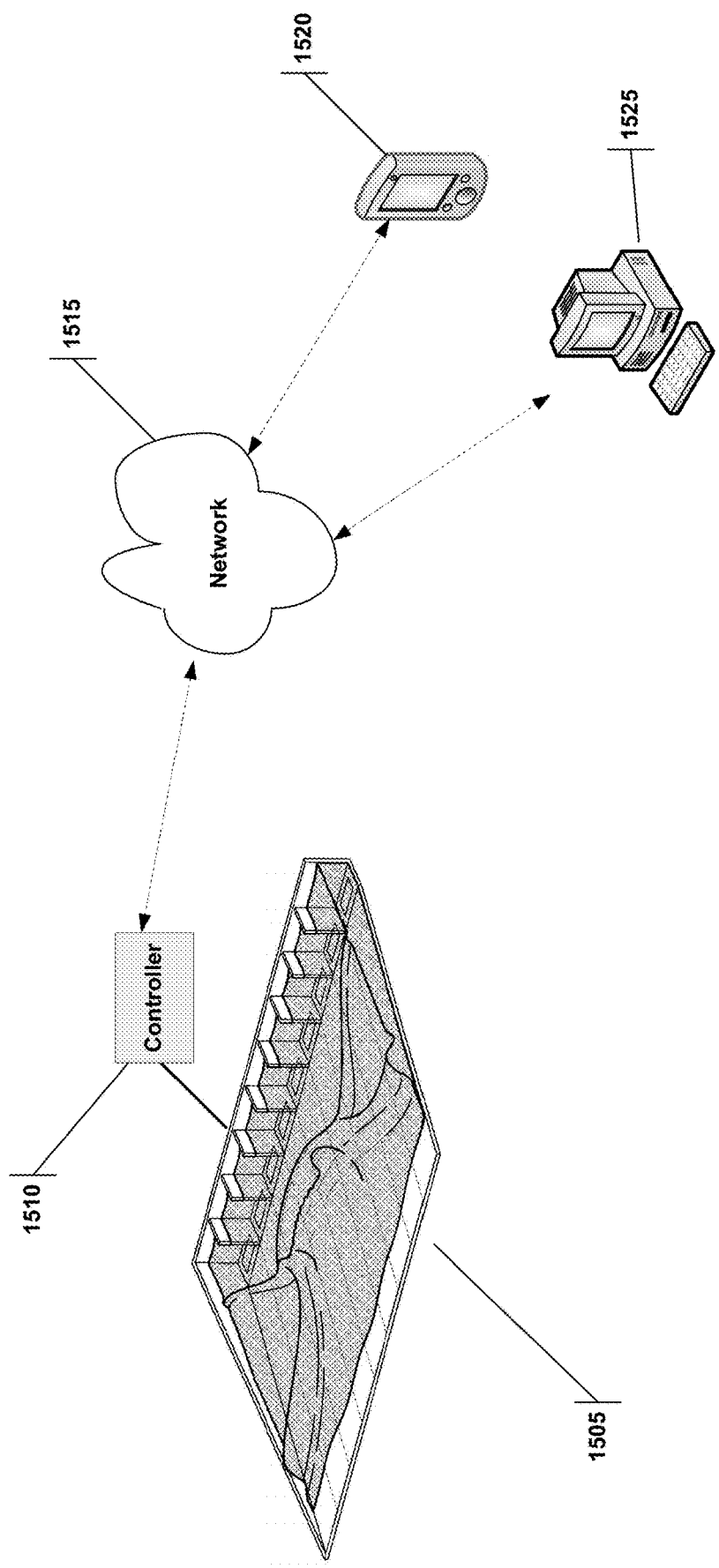
FIG. 15 illustrates the wave generator apparatus connected to a network, along with mobile application controllers connected to the network.

As discussed above, the wave generator can produce a variety of waves because of the sequencing of the individual chambers by the controller. The controller has until now been described as residing at the wave generator facility. This, however, need not be the case. The wave generator apparatus may actually be controlled by the user through a mobile application controller. The mobile application controller may be used on a variety of platforms, such as smartphones (e.g., iPhone, Droid, etc.), tablets (e.g., iPad, Nexus, etc.), laptops, personal digital assistants and personal computers. Referring to FIG. 15, the controller 1510 of the wave generator apparatus 1505 may be connected to the internet, a local area network ("LAN"), a virtual private network, and/or a wireless network 1515, and the mobile application controllers 1520 and 1525 can actually create wave profiles and control the wave generator apparatus 1505. By providing mobile application controllers 1520 and 1525, users can now create their own wave profiles, download those profiles to the wave generator apparatus 1505 through the internet or LAN 1515, produce the actual wave and ride that wave. Never before had a user been able to create a wave and ride that wave. Now they can.

In one embodiment, the interface on the mobile application controller may include a custom wave profile creator. The user may customize the lag between the chambers of the wave generator apparatus and the actuation of chambers, as well as the sequence of actuation, and may experiment with different wave creations. The interface may also include a wave modeling screen, such that the user can see what the customized wave profile would look like prior to communicating the wave profile to controller 1410 and producing an actual wave on the wave generator apparatus 1405. The user, therefore, can create precisely the wave he desires. Moreover, the user can save the customized wave profiles, such that when the user arrives at the wave generator apparatus, the user can select that wave profile, execute the profile on the apparatus and ride the wave. Alternatively, the user can create a wave profile and actuate the wave generator apparatus remotely for someone else to ride. Imagine creating a custom wave and having a professional surfer ride your creation.

Figure 16:
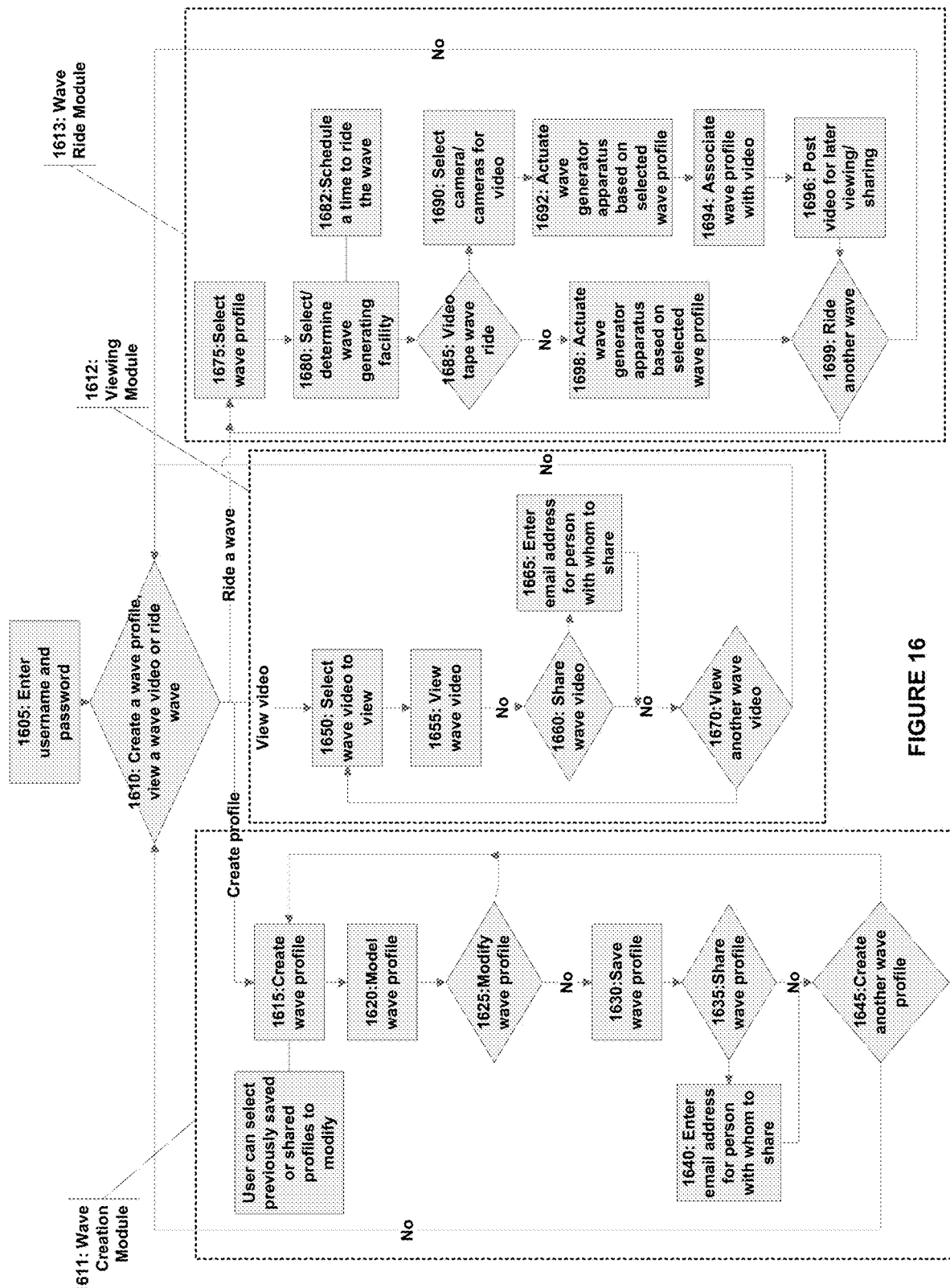
FIG. 16 is a flow chart that describes the method for controlling the wave generating apparatus from a mobile application controller.

One embodiment of the system is shown in FIG. 16. In the first step 1605, the user can enter a username and password so as to retrieve previous wave profiles and videos the user has made. The login step is preferable, but optional. After login, the user is asked at step 1610 what action he would like to take: enter the wave creation module 1611 to create a wave, enter the viewing module 1612 to view a wave video/photograph, or enter the wave ride module 1613 to ride a wave.

If the user selects to create a wave profile, the system enters the wave creation module 1611 and proceeds to step 1615. The details for this step will be discussed below with reference to FIGS. 17-19. It should further be noted that the user at step 1615 may select a previously saved profile or a shared profile to modify. The user may also select a preset profile that the system may offer, and modify that profile. This is discussed in greater detail below. Since this is a system where multiple devices can be used, the user may have created a wave profile on his personal computer and saved that profile, however, when he arrives at that wave generating facility, he may want to make some final tweaks to the wave profile on this smart phone. The system allows for this flexibility. After creating the wave profile, the user has the option at step 1620 to have the application render a computer model of the wave profile to fully visualize what the wave will look like (see step 1620). This is an optional, but preferable step in the system. The user then may choose to modify (step 1625) the wave profile by returning to step 1615 or to save the wave profile at step 1630. The system may then ask at step 1635 whether the user would like to share this profile with another, and if the user so desires, the user would enter the email address or other identifying information at step 1640 such that the system can transmit the wave profile to that third party. The system would then request whether the user would like to create another wave profile at step 1645, and if so, the user is returned to step 1615; otherwise, the user may return to step 1610, or may simply log out.

If the user selects at step 1610 to view a video, the system enters the viewing module 1612, and the user must then select which video he would like to view at step 1650. These videos could include videos taken of the user riding a particular wave, or video of third parties riding waves that have been shared with the user. After viewing the video (step 1655), the system may then ask at step 1660 whether the user would like to share this video with another, and if the user so desires, the user would enter the email address or other identifying information at step 1665 such that the system can transmit the wave video to that third party. Optionally, the system can allow users to assign sharing rights, such that a video from a third party cannot be shared if that third party so chooses. The system would then request whether the user would like to view another wave video at step 1670, and if so, the user is returned to step 1650; otherwise, the user may return to step 1610, or may simply log out. It should be noted that the language used herein is a video; however, it would be apparent to those skilled in the art that still frame photographs could be captured and used in the system.

If the user selects at step 1610 to ride a wave, the system enters the wave ride module, and the user must then select which wave he would like to ride at step 1675. The user must also select or determine the wave generating facility on which the selected wave will be produced and ridden. This is shown at step 1680, and may be accomplished in a number of ways, including a pull-down menu on the mobile application controller. Another non-limiting example is that the mobile application controller could use GPS or the network identification codes to automatically determine which facility is closest and use that facility as the one to create the wave. At step 1682, the user may also at this time schedule a time with the wave generating facility so that he does not needlessly wait for his opportunity to ride the wave. After selecting the wave, the user may optionally be asked whether he would like to have the ride videotaped (or photographed) at step 1685. If so, the user should then determine which camera or cameras should be used (step 1690). For example, the wave generator facility may have cameras available, and the user's mobile application controller may also have a camera. After selecting the cameras, the user may then actuate the wave generator apparatus based on the selected wave profile (step 1692). Then, the system would associate the wave profile with the video or photographs and post those videos for later viewing and/or sharing at steps 1694 and 1696. The system would then request whether the user would like to ride another wave at step 1699, and if so, the user is returned to step 1675; otherwise, the user may return to step 1610, or may simply log out.

It should be noted that the wave profile can be transmitted and actuated by a user who is remote to the wave generating facility. This feature could be used, for example, to allow surfing fans to create waves for professional surfers to ride. The fan could see the wave ride in real time. There are countless promotional activities that can be realized using this user defined, remotely actuated, custom wave creation. It should also be noted that it is not intended that the modules and steps detailed above be in precisely the order described. The order detailed is simply to illustrate the various features of the system.

Figure 17:
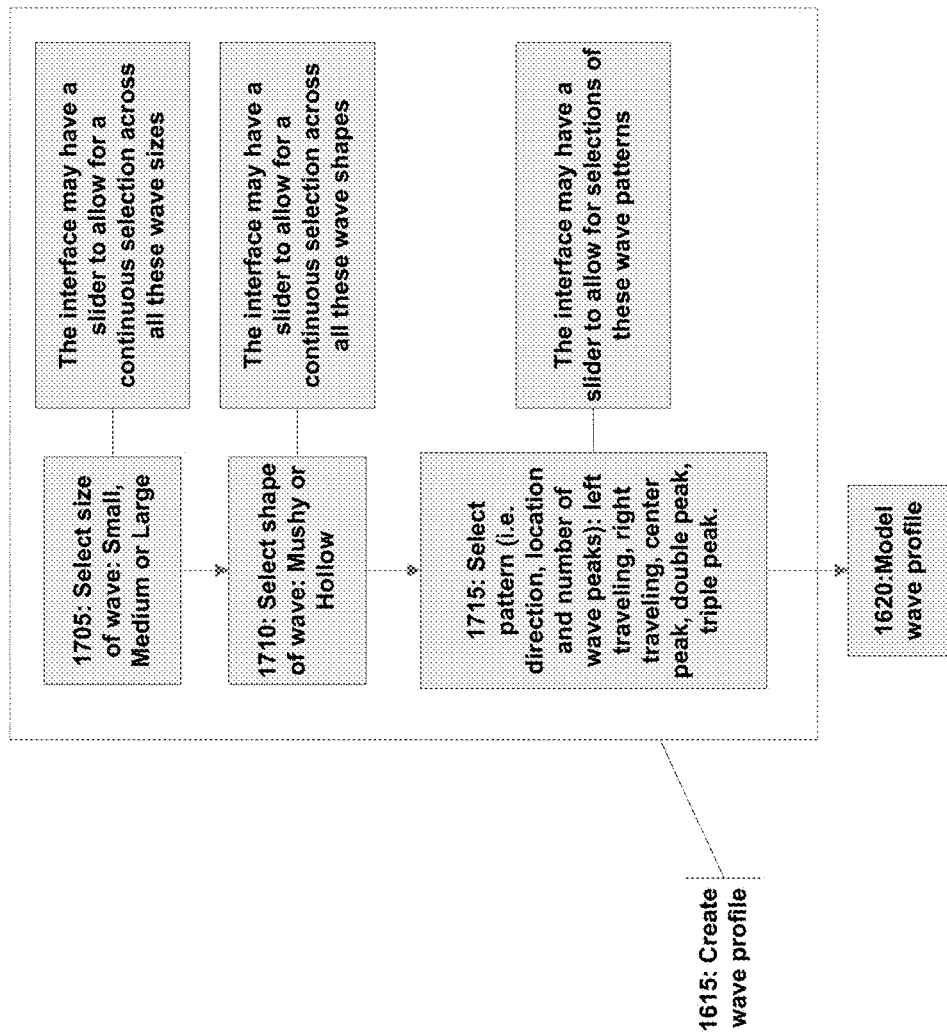
FIG. 17 illustrates an embodiment of the step for creating a wave profile.

Turning now to FIG. 17, the steps in creating the wave profile will be discussed. In one embodiment, the system may allow the user to select only three attributes of the wave profile—i.e., (1) size, (2) shape, and (3) pattern (i.e., location/direction and peak number). For example, at step 1705, the user would select the size of the wave from small, medium or large. Then at step 1710 the user selects the shape of the wave: mushy or hollow. And, finally, at step 1715, the user selects the pattern of the wave (i.e., direction, location and number of wave peaks): left traveling, right traveling, center peak, double peak, triple peak. Each of these selections may be discrete, but the graphical user interface of the system may provide a slider such that these selections are more continuous across a range. After making these selections, the user may view a computer rendering of the wave profile at step 1620.

Figure 18:
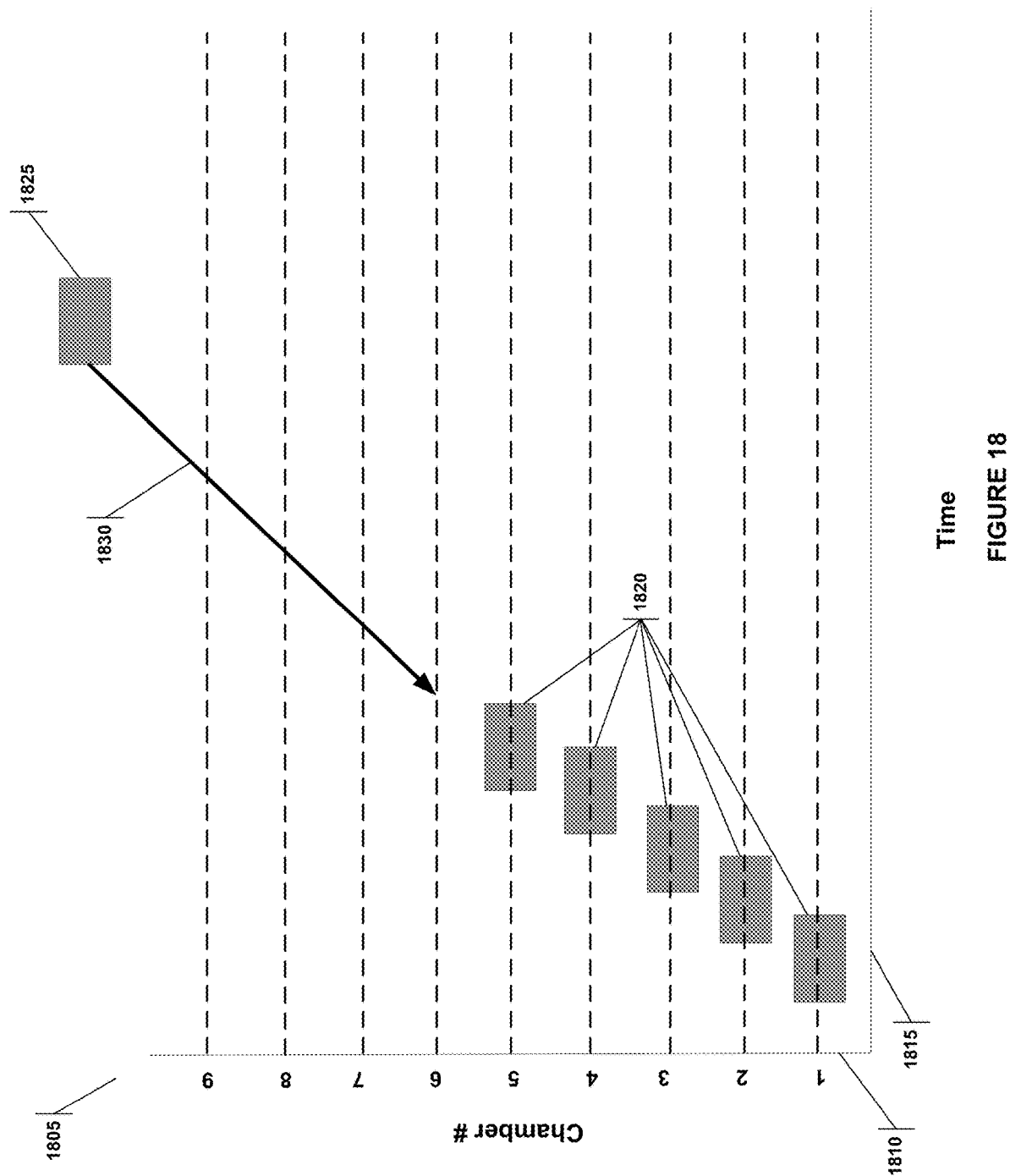
FIG. 18 illustrates an embodiment of the step for creating and modifying a wave profile.

FIG. 18 provides a more complex interface that a user may use to create a wave profile. The user may for example select a present wave profile or use the interface described with reference to FIG. 17 to create a wave profile. The interface could then represent that wave profile on a two-dimensional graph 1805 with the chamber numbers on one axis 1810 and the time on the other axis 1815. The wave profile may be represented as a number of blocks 1820 wherein the left size of the block represents the time along the time axis when that particular chamber is actuated, and the length of the block is the magnitude of the water expelled by that particular chamber. Thus, the present wave profile of blocks 1820 provides instructions to actuate first chamber 1, then after a delay chamber 2, then after a delay chamber 3, then after a delay chamber 4 and, finally, after a delay chamber 5. And each actuation of each chamber is of the same magnitude. The user may then choose to add other chambers to actuate. For example, on a smartphone application, this may entail touching an icon of a block 1825 and dragging it (as shown by arrow 1830) it to an appropriate location to actuate chamber 6. After making these selections, the user may view a computer rendering of the wave profile at step 1620.

Figure 19:
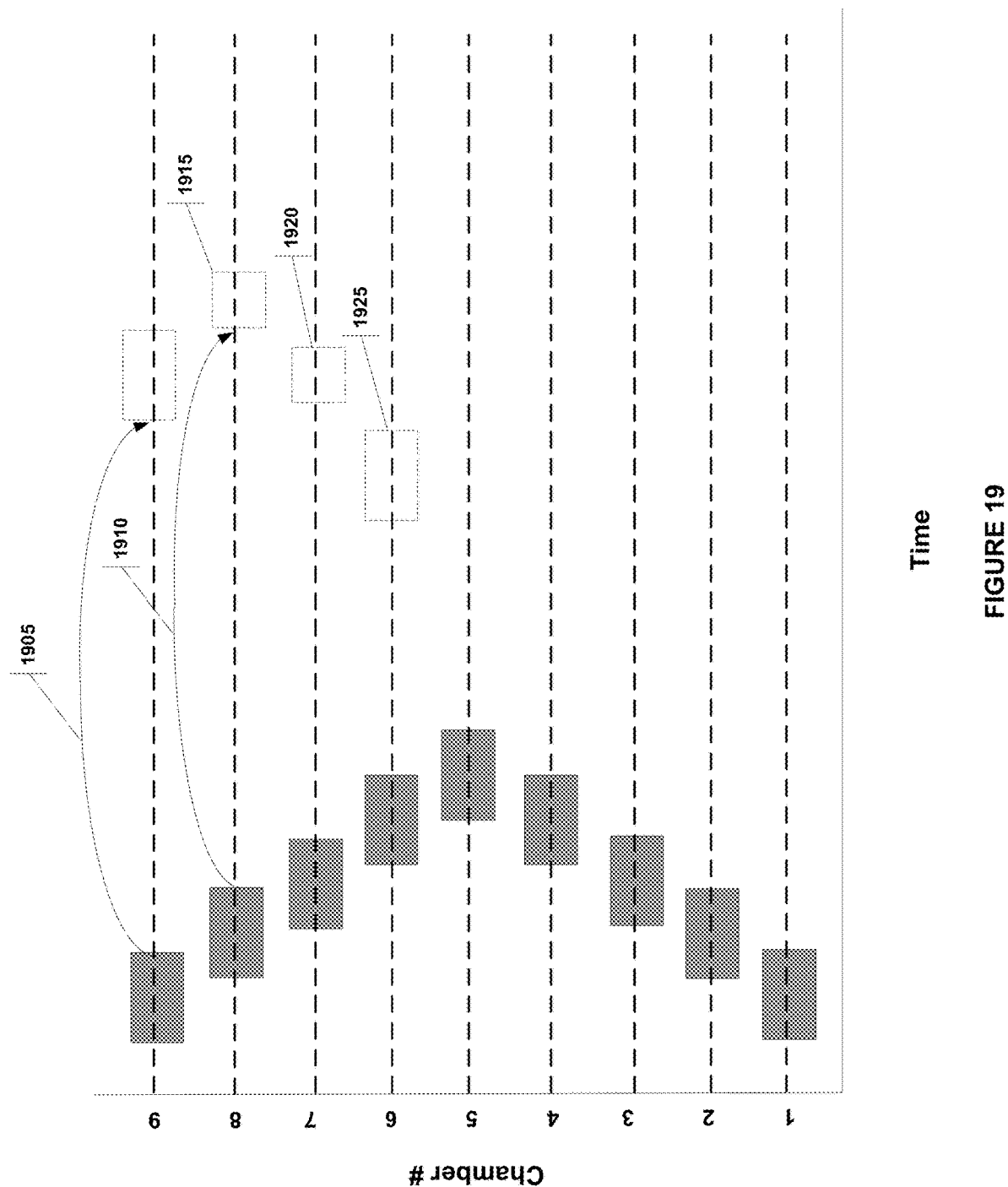
FIG. 19 illustrates an embodiment of the step for creating and modifying a wave profile.

FIG. 19 illustrates that not only can the user add new chamber actuations, but the user can also move, modify and delete existing chamber actuations. Again, the user as shown in FIG. 19 starts with a profile shown by the gray blocks, with chambers 1 and 9 actuating simultaneously, then (after a delay) chambers 8 and 2 actuating simultaneously, then (after a delay) chambers 7 and 3 actuating simultaneously, then (after a delay) chambers 6 and 4 actuating simultaneously and finally (after a delay) chamber 5 actuating. The user may choose to increase the delay of the actuation of chamber 9 by moving the block 1825 along the arrow labeled 1905. The user can also choose to increase the delay of the actuation of chamber 8 by moving the block 1825 along the arrow labeled 1910. The user can also shorten the length of the actuation block of chamber 8 (shown at position 1915) so that the chamber 8 will not expel as much water. The user may also desire to add an actuation of chamber 7 with the same magnitude as that of chamber 8, as shown at position 1920. Finally, the user may add a larger magnitude actuation of chamber 6 at position 1925. The interface may accomplish these movements, modifications and deletions by allowing the user to drag existing actuation blocks to new locations and by allowing a user to modify the magnitude of a block by touching that block on the screen and setting the size (with the size of zero representing a deletion). After making these selections, the user may view a computer rendering of the wave profile at step 1620.

As described above, several users can share their wave profiles. For example, if a professional surfer creates a particular wave profile, other can following in his footsteps and attempt to ride that wave. This creates a community of surfers and promotes competition that is very much alive in the surfing community. Users can also attempt to improve wave profiles that have been shared.

The system may also have a scheduling module such that a user can create and submit a particular wave profile and schedule a time to ride that wave. This is shown in FIG. 16 as step 1682. This minimizes the user's dissatisfaction in waiting for the wave machine to become available, while maximizing the use of the wave machine, with fewer down periods.

The above description of the disclosed example embodiments is provided to enable any person skilled in the art to make or use the invention. Various modifications to these example embodiments will be readily apparent to those skilled in the art, and the generic principles described herein can be applied to other example embodiments without departing from the spirit or scope of the invention. Thus, it is to be understood that the description and drawings presented herein represent a presently preferred example embodiment of the invention and are therefore representative of the subject matter which is broadly contemplated by the present invention. It is further understood that the scope of the present invention fully encompasses other example embodiments that may become obvious to those skilled in the art, and that the scope of the present invention is accordingly limited by nothing other than the appended claims.

The invention claimed is:

1. A method of creating a rideable wave in a pool, the pool having a plurality of pneumatic wave generating chambers with a plurality of air supply valves, the plurality of pneumatic wave generating chambers constructed to push water in the pool to create the rideable wave, the method comprising:
   a. providing an application controller that is connected to the plurality of air supply valves;
   b. creating a wave sequence profile that includes instructions to actuate the air supply valves in the plurality of air supply valves according to a sequence;
   c. programming the application controller according to the wave sequence profile;
   d. the controller actuating a first air supply valve in the plurality of air supply valves to inject air into a first chamber in the plurality of pneumatic wave generating chambers thereby pushing water in the pool;
   e. after a delay, the controller actuating a second air supply valve in the plurality of air supply valves to inject air into a second chamber in the plurality of pneumatic wave generating chambers thereby pushing water in the pool;
   wherein steps (d) and (e) are based on the wave sequence profile.

2. An aquatic sports apparatus, comprising:
   a pool;
   a plurality of pneumatic wave generating chambers constructed to release water into the pool;
   a plurality of air supply valves;
   a wave sequence profile comprising instructions to actuate the air supply valves in the plurality of air supply valves according to a sequence; and
   a controller connected to the plurality of air supply valves, and constructed to perform the following steps to create a ridable wave with a peak:
   a. actuating a first air supply valve in the plurality of air supply valves to inject air into a first chamber in the plurality of pneumatic wave generating chambers thereby releasing water into the pool;
   b. after a delay, actuating a second air supply valve in the plurality of air supply valves to inject air into a second chamber in the plurality of pneumatic wave generating chambers thereby releasing water into the pool;
   wherein steps (a) and (b) are based on the wave sequence profile.

3. The apparatus of claim 2, wherein:
   the pool comprises a beach;
   the plurality of pneumatic wave generating chambers have a chamber face that forms a chamber edge of the pool opposite to the beach, wherein a projection of the chamber edge across the pool to the beach defines an area;
   the pool comprising a region that extends away from the area; and
   the peak travels into the region.

4. The apparatus of claim 2, wherein:
the plurality of pneumatic wave generating chambers have a chamber face that forms a chamber edge of the pool, wherein the pool extends away from the plurality of pneumatic wave generating chambers in a direction parallel to the chamber face, forming a region; and
the peak travels into the region.

5. The apparatus of claim 2, wherein the pool has a floor, the floor comprising a first portion and a second portion, wherein the first portion has a steeper slope than that of the second portion, and wherein the first portion is positioned closer to the plurality of pneumatic wave generating chambers than is the second portion.

6. The apparatus of claim 2, wherein the pool has a floor, the floor comprising a first portion and a second portion, wherein the second portion has a steeper slope than that of the first portion, and wherein the first portion is positioned closer to the plurality of pneumatic wave generating chambers than is the second portion.

7. The apparatus of claim 2, wherein the controller generates a graphical model of the wave based on the wave sequence profile.

8. The apparatus of claim 7, wherein a wave creation module allows the operator to modify the wave sequence profile after the controller generates the graphical model.

9. The apparatus of claim 2, wherein the wave sequence profile is created on a separate device from the controller.

10. The apparatus of claim 2, further comprising a source of pressurized air connected to the plurality of air supply valves.

11. The apparatus of claim 2, wherein the controller performs the following steps:
(a)(1) after step (a), actuating the first chamber in the plurality of pneumatic wave generating chambers to draw water from the pool; and
(b)(1) after step (b), actuating the second chamber in the plurality of pneumatic wave generating chambers to draw water from the pool.

12. The apparatus of claim 11, wherein step (a)(1) is performed by depressurizing the first chamber in the plurality of pneumatic wave generating chambers; and step (b)(1) is performed by depressurizing the second chamber in the plurality of pneumatic wave generating chambers.

13. The apparatus of claim 11, comprising a plurality of venting valves connected to the plurality of pneumatic wave generating chambers and connected to the controller, wherein step (a)(1) is performed by actuating a first venting valve in the plurality of venting valves; and step (b)(1) is performed by actuating a second venting valve in the plurality venting valves.

14. An aquatic sports apparatus, comprising:
a pool;
a plurality of pneumatic wave generating chambers constructed to release water into the pool;
a plurality of air supply valves;
a wave sequence profile comprising instructions to actuate the air supply valves in the plurality of air supply valves according to a sequence; and
a controller connected to the plurality of air supply valves, and wherein the controller performs the following steps:
to create a first ridable wave with a peak:
  a. actuating a first air supply valve in the plurality of air supply valves to inject air into a first chamber in the plurality of pneumatic wave generating chambers thereby releasing water into the pool;
  b. after a delay, actuating a second air supply valve in the plurality of air supply valves to inject air into a second chamber in the plurality of pneumatic wave generating chambers thereby releasing water into the pool;
to create a second ridable wave with a peak:
  c. actuating a third air supply valve in the plurality of air supply valves to inject air into a third chamber in the plurality of pneumatic wave generating chambers thereby releasing water into the pool;
  d. after a delay, actuating a fourth air supply valve in the plurality of air supply valves to inject air into a fourth chamber in the plurality of pneumatic wave generating chambers thereby releasing water into the pool;
wherein steps (a), (b), (c) and (d) are based on the wave sequence profile;
wherein the first wave comprises a first peak traveling in a first direction, and the second wave comprises a second peak traveling in a second direction that is different from the first direction.

15. The apparatus of claim 14, wherein the pool has a floor, the floor comprising a first portion and a second portion, wherein the first portion has a steeper slope than that of the second portion, and wherein the first portion is positioned closer to the plurality of pneumatic wave generating chambers than is the second portion.

16. The apparatus of claim 14, wherein the pool has a floor, the floor comprising a first portion and a second portion, wherein the second portion has a steeper slope than that of the first portion, and wherein the first portion is positioned closer to the plurality of pneumatic wave generating chambers than is the second portion.

17. The apparatus of claim 14, further comprising a source of pressurized air connected to the plurality of air supply valves.

18. The apparatus of claim 14, wherein the controller performs the following steps:
(a)(1) after step (a), actuating the first chamber in the plurality of pneumatic wave generating chambers to draw water from the pool; and
(b)(1) after step (b), actuating the second chamber in the plurality of pneumatic wave generating chambers to draw water from the pool.

19. The apparatus of claim 18, wherein step (a)(1) is performed by depressurizing the first chamber in the plurality pneumatic wave generating chambers; and step (b)(1) is performed by depressurizing the second chamber in the plurality of pneumatic wave generating chambers.

20. The apparatus of claim 18, comprising a plurality of venting valves connected to the plurality of pneumatic wave generating chambers and connected to the controller, wherein step (a)(1) is performed by actuating a first venting valve in the plurality of venting valves; and step (b)(1) is performed by actuating a second venting valve in the plurality of venting valves.

* * * * *